US008904297B2

(12) United States Patent
Onda et al.

(10) Patent No.: US 8,904,297 B2
(45) Date of Patent: Dec. 2, 2014

(54) METHOD AND SYSTEM FOR PROVIDING INFORMATION IN VIRTUAL SPACE

(75) Inventors: Yasushi Onda, Tokyo (JP); Izua Kano, Yokohama (JP); Dai Kamiya, Tokyo (JP); Keiichi Murakami, Ichikawa (JP); Eiju Yamada, Yokohama (JP); Kazuhiro Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1257 days.

(21) Appl. No.: 12/061,273

(22) Filed: Apr. 2, 2008

(65) Prior Publication Data
US 2009/0083627 A1    Mar. 26, 2009

(30) Foreign Application Priority Data
Apr. 6, 2007    (JP) .................................. 2007-101069

(51) Int. Cl.
*G06F 3/048*    (2013.01)
*G06F 3/0481*    (2013.01)
*G06F 17/30*    (2006.01)

(52) U.S. Cl.
CPC ...... *G06F 17/30861* (2013.01); *G06F 3/04815* (2013.01); *A63F 2300/5573* (2013.01); *A63F 2300/305* (2013.01); *Y10S 707/918* (2013.01); *Y10S 707/921* (2013.01)
USPC ........... 715/757; 715/751; 715/753; 715/764; 715/848; 715/850; 707/918; 707/921

(58) Field of Classification Search
CPC . G06F 3/04815; G06F 3/0482; G06F 3/0481; G06F 3/048
USPC ................. 701/200, 201, 207, 208, 209, 211; 707/918, 921; 715/751, 753, 757, 764, 715/848, 849, 850, 851
See application file for complete search history.

(56) References Cited

U.S. PATENT DOCUMENTS 6,266,613 B1 *   7/2001   Nimura et al. ................ 701/418
6,434,556 B1 *   8/2002   Levin et al. ........................ 1/1
(Continued)

FOREIGN PATENT DOCUMENTS

DE    10039687 A1    2/2002
EP    0995973 A2    4/2000
(Continued)

OTHER PUBLICATIONS

Office Communication dated Oct. 31, 2008.
(Continued)

*Primary Examiner* — Steven Sax
*Assistant Examiner* — David Choi
(74) *Attorney, Agent, or Firm* — MKG, LLC

(57) ABSTRACT

In an information providing system, a virtual three-dimensional space is established by an information management server. A user of a mobile communication terminal moves in the virtual space, and browses, posts, and searches message information items by manipulating an avatar. The information management server manages the message information items and responds to searches requested from mobile communication terminals. The information management server specifies an area where the number of message information items relevant to a search word specified by a user of a mobile communication terminal is equal to or greater than a predetermined number. The information management server outputs a guide information item for indicating a direction or route toward the specified area from the position of an avatar. Based on the guide information item, the mobile communication terminal displays an image of an arrow pointing a direction or route toward the specified area as a target area.

13 Claims, 17 Drawing Sheets

(56) References Cited

U.S. PATENT DOCUMENTS

| | | | |
|---|---|---|---|
| 6,757,616 B1* | 6/2004 | Emmons et al. | 702/18 |
| 7,085,753 B2* | 8/2006 | Weiss et al. | 707/710 |
| 7,146,273 B2* | 12/2006 | Kadono et al. | 701/420 |
| 7,148,892 B2* | 12/2006 | Robertson et al. | 345/427 |
| 7,159,011 B1* | 1/2007 | Knight et al. | 709/207 |
| 7,647,306 B2* | 1/2010 | Rose et al. | 707/999.003 |
| 7,653,877 B2* | 1/2010 | Matsuda | 715/706 |
| 7,689,935 B2* | 3/2010 | Gould et al. | 715/850 |
| 7,814,436 B2* | 10/2010 | Schrag et al. | 715/851 |
| 8,024,662 B2* | 9/2011 | Jerrard-Dunne et al. | 715/751 |
| 8,042,051 B2* | 10/2011 | Jerrard-Dunne et al. | 715/757 |
| 8,132,123 B2* | 3/2012 | Schrag et al. | 715/851 |
| 2002/0007314 A1* | 1/2002 | Maruyama | 705/14 |
| 2004/0260695 A1* | 12/2004 | Brill | 707/5 |
| 2005/0015725 A1* | 1/2005 | Matsuda | 715/706 |
| 2005/0030309 A1* | 2/2005 | Gettman et al. | 345/419 |
| 2006/0031578 A1* | 2/2006 | Pelletier | 709/245 |
| 2006/0294085 A1* | 12/2006 | Rose et al. | 707/3 |
| 2006/0294086 A1* | 12/2006 | Rose et al. | 707/3 |
| 2007/0005587 A1* | 1/2007 | Johnson et al. | 707/5 |
| 2007/0013701 A1* | 1/2007 | Segawa et al. | 345/502 |
| 2007/0180093 A1* | 8/2007 | Roth et al. | 709/223 |
| 2008/0059570 A1* | 3/2008 | Bill | 709/203 |
| 2009/0083627 A1* | 3/2009 | Onda et al. | 715/708 |
| 2009/0300516 A1* | 12/2009 | Jerrard-Dunne et al. | 715/752 |
| 2010/0257468 A1* | 10/2010 | Bernardo et al. | 715/760 |

FOREIGN PATENT DOCUMENTS

| | | |
|---|---|---|
| EP | 1814049 A1 | 8/2007 |
| JP | 06-324662 A | 11/1994 |
| JP | 2000-311256 | 11/2000 |
| JP | 2002-183407 A | 6/2002 |
| JP | 2004-147067 A | 5/2004 |
| JP | 2004-178086 | 6/2004 |
| JP | 2005-127854 A | 5/2005 |
| JP | 2006-003286 A | 5/2006 |
| JP | 2006-155431 A | 6/2006 |
| WO | 2005013147 A1 | 2/2005 |

OTHER PUBLICATIONS

Dieberger, Andreas; et al. "A City Metaphor to Support Navigation in Complex Information Spaces" Journal of Visual Languages and Computing. 1998. pp. 597-622.

European Office Action for EP08 006 892.7-1225, dated Feb. 27, 2009.

Office Action with English Translation, Mailing Date—Sep. 13, 2011, issued in conjunction with JP Patent Application No. 2007-101069.

* cited by examiner

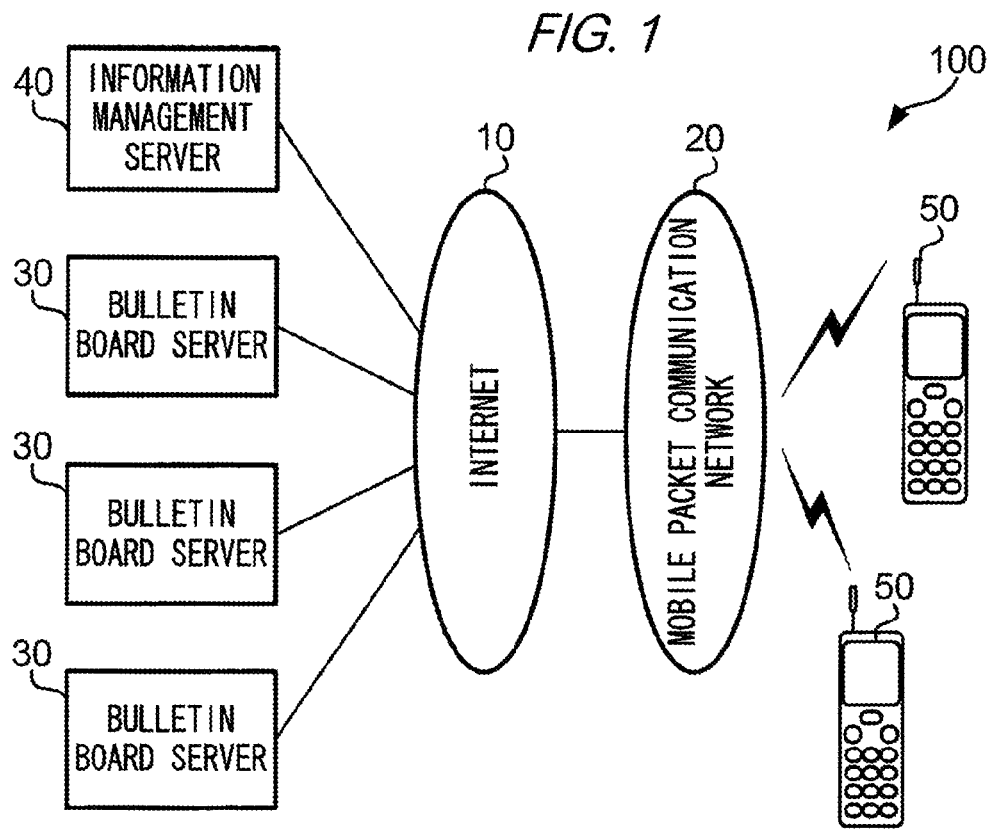
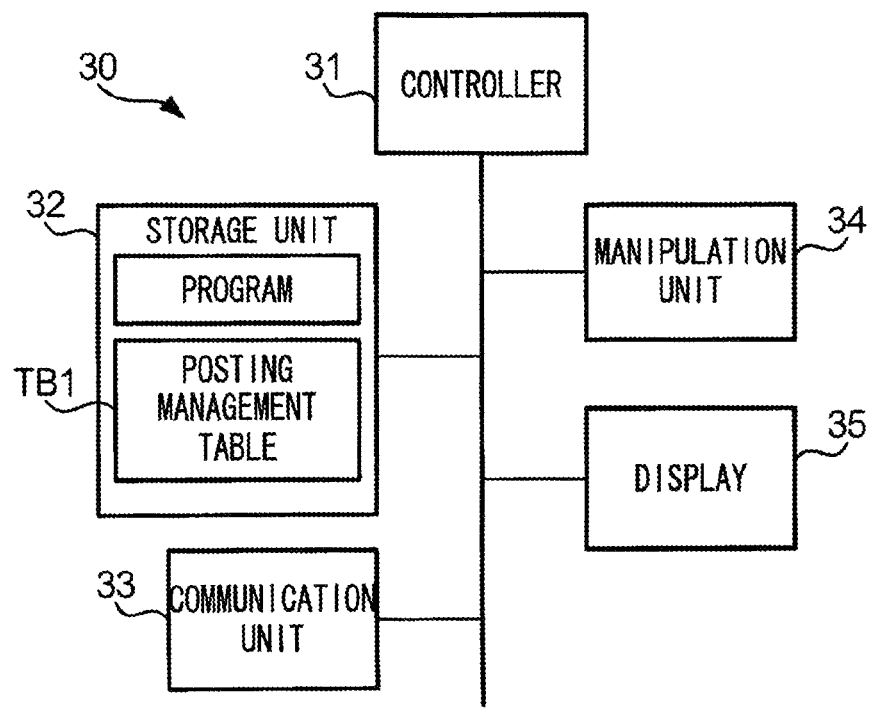

| MESSAGE INFORMATION ID | USER ID | POSTING TIME | VIEWING COUNT | TITLE | BODY |
|---|---|---|---|---|---|
| 0001 | A | 2006.09.01 01.23.45 | 7 | RE: XXX | ·········· |
| 0002 | B | 2006.09.01 12.34.56 | 2 | RE: YYY | ·········· |
| ⋮ | ⋮ | ⋮ | ⋮ | ⋮ | ⋮ |

| TERM ID | TERM | RELEVANT TERM ID |
|---|---|---|
| 1 | MOTION PICTURE | 2,3,5 |
| 2 | THEATER | 1,3,5 |
| 3 | CINEMA | 1,2,5 |
| 4 | GOURMET | 6,7,8 |
| 5 | MOVIE | 1,2,3 |
| 6 | LUNCH | 4,7 |
| 7 | SUSHI | 4,6,8 |
| 8 | DINNER | 4,7 |
| ⋮ | ⋮ | ⋮ |

| USER ID | USER PROPERTY |
|---|---|
| A | 5 |
| B | 2 |
| ⋮ | ⋮ |

| BULLETIN BOARD ID | POSITION INFORMATION | DISPLAY DATA | ADDRESS INFORMATION | FIRST KEYWORD |
|---|---|---|---|---|
| 01 | x=⋯,y=⋯,z=⋯ | ⋯⋯.gif | http://⋯⋯ | MOTION PICTURE |
| 02 | x=⋯,y=⋯,z=⋯ | ⋯⋯.gif | http://⋯⋯ | GOURMET |
| ⋮ | ⋮ | ⋮ | ⋮ | ⋮ |

| TB5 | BULLETIN BOARD ID | MESSAGE INFORMATION ID | USER ID | SECOND KEYWORD |
|---|---|---|---|---|
| | 01 | 0001 | A | COMEDY、········ |
| | 02 | 0002 | B | Italian、······ |
| | ⋮ | ⋮ | ⋮ | ⋮ |

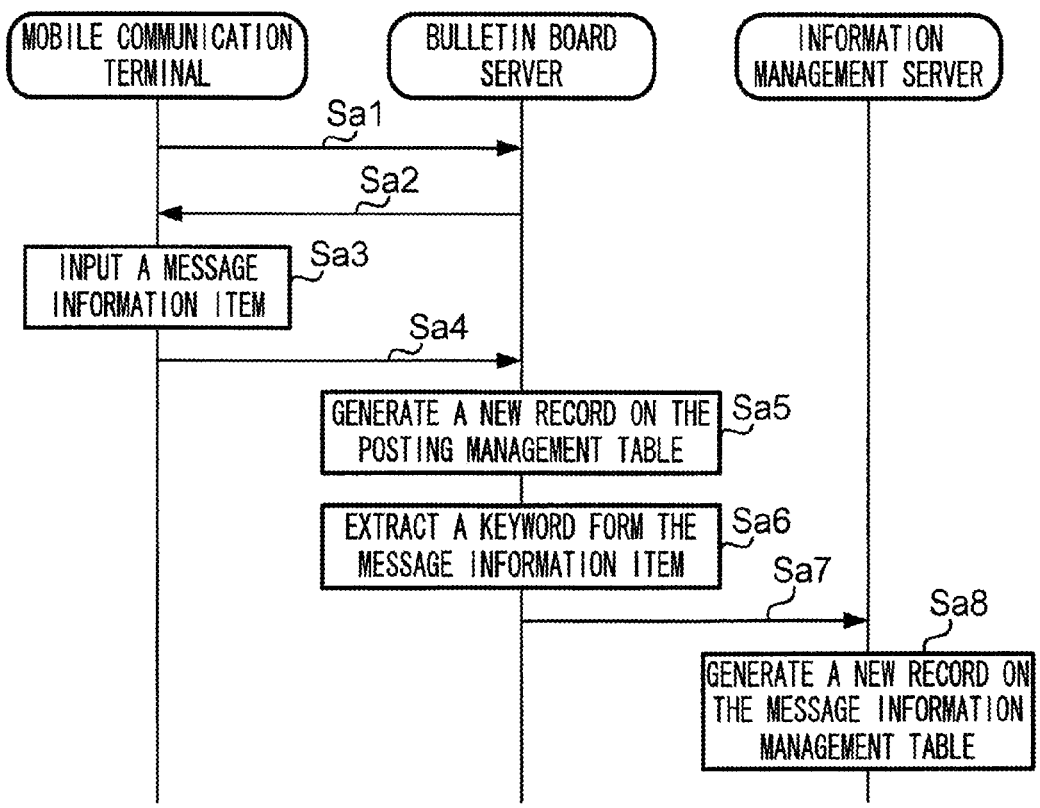
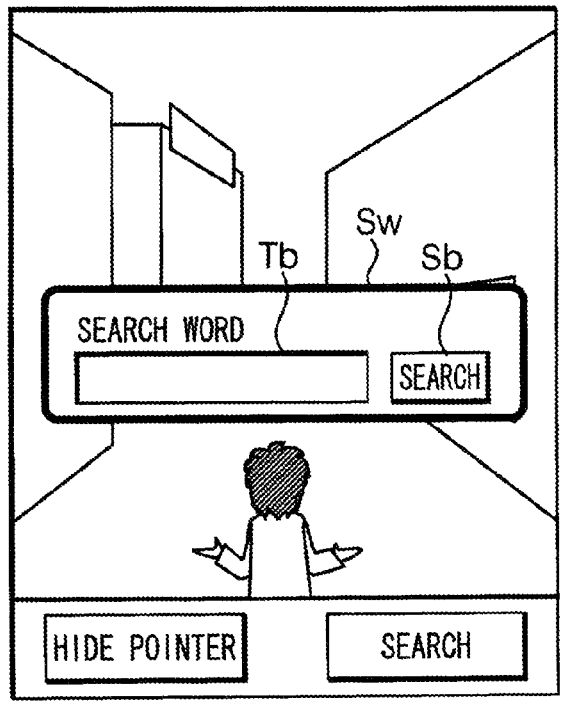

| MESSAGE INFORMATION ID | POSITION INFORMATION | POSTING TIME | VIEWING COUNT | TITLE | BODY |
|---|---|---|---|---|---|
| 0001 | x=⋯,y=⋯,z=⋯ | 2006.09.01 01.23.45 | 7 | RE: XXX | ⋯⋯ |
| 0002 | x=⋯,y=⋯,z=⋯ | 2006.09.01 12.34.56 | 2 | RE: YYY | ⋯⋯ |
| ⋮ | ⋮ | ⋮ | ⋮ | ⋮ | ⋮ |

METHOD AND SYSTEM FOR PROVIDING INFORMATION IN VIRTUAL SPACE

BACKGROUND

1. Field of the Invention

The present invention relates to a technique for sharing a variety of information in a two-dimensional or three-dimensional virtual space.

2. Description of the Related Art

There is a known technique for displaying an avatar in a virtual space and moving the avatar in accordance with manipulations made by a user (refer, for example, to JP-A 2000-311256). In another known technique, information such as an advertisement is displayed in a virtual space (refer, for example, to JP-A 2004-178086). By use of these techniques, an avatar can be freely moved in accordance with manipulations made by a user, and information such as an advertisement can be presented at a position appropriate for the user. Since the user can collect information while manipulating the avatar to move in the virtual space, a game-like entertainment quality can be added.

However, with mechanisms of the techniques as described above, it is difficult for users to find out advantageous information for the users if a huge number of items of information exist, dispersed in a vast expanse of a virtual space.

SUMMARY

The invention has been made in view of circumstances described above and is directed to providing a technique which can facilitate obtaining of desired information in a virtual space by users.

To achieve the object described above, an area guide device according to one aspect of the invention includes: a storage unit that stores a plurality of display information items each associated with a position in a virtual space, a plurality of keywords, and a plurality of position information items associated with the keywords, each of the plurality of display information items being associated with one of the plurality of keywords and one of the plurality of position information items; an obtaining unit that obtains a search word; an extraction unit that extracts any of the plurality of position information items associated with a keyword relevant to the search word obtained by the obtaining unit, from among the plurality of position information items stored in the storage unit; a first specifying unit that specifies an area where a number of position information items extracted by the extraction unit is equal to or greater than a predetermined number; a calculation unit that calculates a degree of relevance between the area specified by the first specifying unit and the search word, on the basis of a number of position information items included in the area specified by the first specifying unit; a second specifying unit that specifies an area where the degree of relevance calculated by the calculation unit is equal to or greater than a predetermined level; and an output unit that outputs a guide information item indicating the area specified by the second specifying unit.

Alternatively, the area guide according to the above aspect of the invention may be configured so that the output unit outputs a guide information item which points a direction or a route toward the area specified by the second specifying unit from a start point which is a position in the virtual space. Also alternatively, the area guide device may be configured so that the output unit outputs a guide information item for changing at least a part of a display style of the area specified by the second specifying unit.

Further alternatively, the area guide device according the above aspect of the invention may be configured so that the output unit outputs a guide information item including an outer-appearance information item which visually points out a direction or route, and the output unit includes a determination unit that determines a display style of the outer-appearance information item, depending on the degree of relevance calculated by the calculation unit for the area specified by the second specifying unit.

Still alternatively, the determination unit may be configured so as to determine the display style of the outer-appearance information item, depending on the degree of relevance calculated by the calculation unit for the area specified by the second specifying unit, and depending on a distance or a route length from the area to the start point.

Still alternatively, the area guide device may be configured so as to further include a position obtaining unit that obtains a position indication information item indicating a position of the start point, wherein the determination unit changes the display style of the outer-appearance information item, depending on the position of the start point indicated by the position indication information item obtained by the position obtaining unit.

Still alternatively, the area guide device according to the above aspect of the invention may be configured so as to further include a position obtaining unit that obtains a position indication information item indicating the position of the start point, wherein the output unit further outputs a notification information item indicating that a distance or a route length from the position included in the area specified by the second specifying unit to the position of the start point indicated by the position indication information item obtained by the position obtaining unit is equal to or smaller than a predetermined value, if the distance or the route length is equal to or smaller than the predetermined value.

Still alternatively, the area guide device according to the above aspect of the invention may be configured so that the storage unit stores weight information items respectively for the plurality of display information items, the weight information items indicating weights to be applied to the plurality of display information items, respectively; and the calculation unit further calculates a degree of relevance between the area and the search word by using the weight information items.

In this case, the configuration may be arranged so that the display information items each include a data set to be downloaded by a plurality of external terminals, and the storage unit stores, for each of the plurality of display information items, a count information item indicating a number of times the data item has been downloaded, as the weight information item.

Alternatively, the display information items each may be configured so as to include a data set to be displayed by a plurality of external terminals, and the storage unit may be configured so as to store, for each of the plurality of display information items, time information indicating a length of time during which the data has been displayed, as the weight information item.

Alternatively, the above configuration may be arranged so that the plurality of display information items each have been generated, triggered by a data set which was input from a user of an external terminal, and the storage unit stores, for each of the plurality of display information items, a property information item indicating a property of the user who has input the data set which triggered generation of the each of the plurality of display information items.

According to another aspect of the invention, there is provided a method including: obtaining a search word; extracting any of a plurality of position information items associated with a keyword relevant to the obtained search word, from a storage unit that stores the plurality of display information items each associated with a position in a virtual space, a plurality of keywords, and a plurality of position information items associated with the keywords, each of the plurality of display information items being associated with one of the plurality of keywords and one of the plurality of position information items; specifying an area where a number of the extracted position information items is equal to or greater than a predetermined number; calculating a degree of relevance between the specified area and the search word, on the basis of a number of position information items included in the specified area; specifying an area where the calculated degree of relevance is equal to or greater than a predetermined level; and outputting a guide information item indicating the specified area where the calculated degree of relevance is equal to or greater than the predetermined level.

According to still another aspect of the invention, there is provided a program for performing functions executed by the area guide device described above, or a recording medium which records the program. The program according to this aspect of the invention is, for example, to cause a computer to execute a process, the computer having a storage unit that stores a plurality of display information items each associated with a position in a virtual space, a plurality of keywords, and a plurality of position information items associated with the keywords, each of the plurality of display information items being associated with one of the plurality of keywords and one of the plurality of position information items, and the process including: obtaining a search word; extracting any of a plurality of position information items associated with a keyword relevant to the obtained search word, from among the plurality of position information items stored in the storage unit; specifying an area where a number of the extracted position information items is equal to or greater than a predetermined number; calculating a degree of relevance between the specified area and the search word, on the basis of a number of position information items included in the specified area; specifying an area where the calculated degree of relevance is equal to or greater than a predetermined level; and outputting a guide information item indicating the specified area where the calculated degree of relevance is equal to or greater than the predetermined level.

BRIEF DESCRIPTION OF THE DRAWINGS

Exemplary embodiments of the present invention will be described in detail based on the following figures, wherein:

FIG. 1 schematically shows an entire configuration of an information providing system according to a first embodiment of the invention;

FIG. 2 is a block diagram showing a structure of a bulletin board server;

FIG. 5 shows an example of a relevant term table;

FIG. 6 shows an example of a user management table;

FIG. 7 shows an example of a bulletin board management table;

FIG. 15 is a sequence chart showing a series of processings relating to posting of a message information item;

FIG. 17 shows an example of a screen image displayed by the display of the mobile communication terminal;

DETAILED DESCRIPTION

Figures 3, 4:
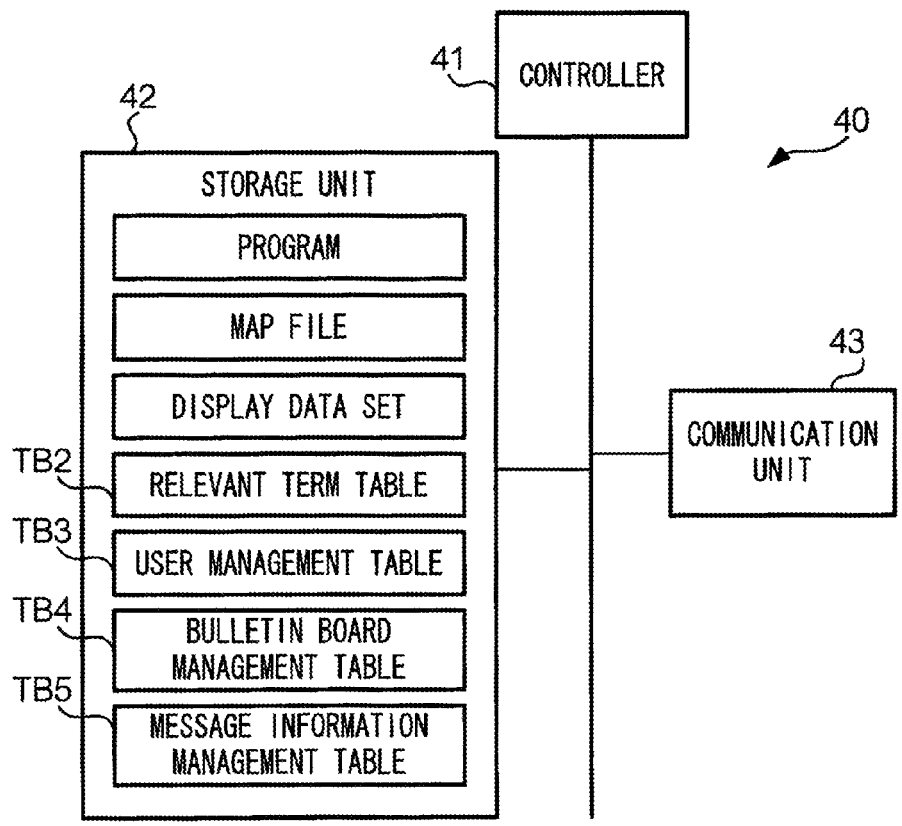
FIG. 3 shows an example of a posting management table.
FIG. 4 is a block diagram showing a structure of an information management server.

Hereinafter, exemplary embodiments of the invention will be described with reference to the drawings.

First Embodiment

FIG. 1 schematically shows an entire configuration of an information providing system 100 according to the first embodiment of the invention. As shown in the figure, the information providing system 100 includes the Internet 10, a mobile packet communication network 20, plural bulletin board servers 30, an information management server 40, and plural mobile communication terminals 50. More bulletin servers 30 and mobile communication terminals 50 than those shown in the figure may be provided in practice.

In the information providing system 100, a virtual three-dimensional space (hereinafter simply "virtual space") is created by the information management server 40. Each user of the mobile communication terminals 50 moves virtually in the virtual space by manipulating an avatar representing the user, and obtains a variety of information through a bulletin board system, which will be described later. An administrator of each of the bulletin board servers 30 installs a bulletin board system associated with an appropriate position in the virtual space, and provides information for users of the mobile communication terminals 50. The virtual space according to this embodiment may be a space that imitates a real place, which actually exists, or an unreal, fictional place.

Described next will be structures of respective parts constituting the information providing system 100. The Internet 10 is a network including server devices, routers, etc., which are not shown in the figure. The Internet 10 mutually connects the bulletin board servers 30 and the information management server 40. The Internet 10 transfers data through procedures which comply with TCP/IP (Transmission Control Protocol/Internet Protocol), HTTP (HyperText Transfer Protocol), SMTP (Simple Mail Transfer Protocol), etc.

The mobile packet communication network 20 is a network for providing mobile packet communication services for the mobile communication terminals 50. In the mobile packet communication network 20, data is transferred by use of procedures which comply with a simplified version of TCP/IP, or a protocol equivalent to HTTP which runs on the simplified version of TCP/IP. The mobile packet communication network 20 is managed by a predetermined communication provider (a so-called carrier). The mobile packet communication network 20 includes base stations, exchange centers, and gateway servers, which are not shown. Each of the gateway servers is a server device which performs protocol conversions and contributes to establishment of mutual communication between the internet 10 and the mobile packet communication network 20.

Each of the bulletin board servers 30 is a server device which provides a bulletin board system in the present system. In this embodiment, the bulletin board servers 30 each have a structure as shown in FIG. 2. That is, the bulletin board servers 30 each include a controller 31, a storage unit 32, a communication unit 33, a manipulation unit 34, and a display 35.

The controller 31 has a CPU (Central Processing Unit), a ROM (Read Only Memory), a RAM (Random Access Memory), etc. The CPU executes programs stored in the storage unit 32 by using the RAM as a work area, to control respective parts constituting the bulletin board server 30. The storage unit 32 has a storage device such as a HDD (Hard Disk Drive), and stores the programs executed by the controller 31 and a posting management table TB1 for managing message information which is posted to the bulletin board system. The programs stored in the storage unit 32 include, for example, not only a program for causing a bulletin board server to function as a Web server but also a program for browsing data described in an HTML format or a format compatible with the HTML format. The communication unit 33 is an interface device for making communication via the Internet 10. The manipulation unit 34 includes manipulators such as buttons, and supplies the controller 31 with manipulation signals in response to manipulations of an administrator. The display 35 is a display device which includes a liquid crystal panel and a liquid crystal driving circuit, which are not shown. The display 35 displays information in accordance with image signals supplied from the controller 31.

In this embodiment, the "bulletin board systems" each are a system which associates a so-called electronic bulletin board with a predetermined position in the virtual space and allows users of the mobile communication terminals 50 to post information and/or to browse posted information. The bulletin board system is constituted of, for example, a CGI (Common Gateway Interface) program. Each "message information item" refers to one of items of information posted to the bulletin board system. That is, a message information item consists of a set of information posted by a user of a mobile communication terminal 50, and each of the bulletin board systems accumulates such message information items, allowing users to browse the accumulated message information items.

In this embodiment, each message information item is associated with the position of a bulletin board system to which the message information item has been posted. That is, a position associated with a message information item is the same as a position associated with a bulletin board system to which the message information item has been posted.

The posting management table TB1 stored in the storage unit 32 will now be specifically described below. FIG. 3 shows an example of the posting management table TB1. As shown in the figure, the posting management table TB1 is a collection of records (which are respectively written in lines) each including six fields which respectively correspond to six columns "Bulletin Board Information ID", "User ID", "Posting Time", "Viewing count", "Title" and "Body". One record corresponds to one message information item. Each of the fields represents content as follows.

In the field "Message information ID", a value (ID) which uniquely identifies a message information item is stored. This value is an arbitrary digit string which does not overlap between records. The field "User ID" stores a value (ID) which uniquely identifies a user who posted the message information item. This value has been predetermined, e.g., registered at the time of using the present system. The field "Posting Time" stores a value indicating a time when the message information item was posted. This value indicates, for example, a date (year/month/date) and time (hour/minute). The field "Viewing count" stores a count value indicating how many times the message information item has been browsed. This value takes "0" as an initial value. The fields "title" and "Body" respectively store values indicating a title and a body of the message information item. In the figure, these values are shown as ideographical characters. However, actually stored values are expressed as predetermined code information, such as character codes.

The bulletin board servers 30 are respectively assigned with information items which identify the bulletin board servers. In this embodiment, domain names are used as such information items. Similarly, the bulletin board systems are respectively assigned with information items which identify the bulletin board systems. In this embodiment, URIs (Uniform Resource Identifiers) are used as such information items, and respectively indicate site locations where resources of the bulletin board systems are located on the Internet 10. The URIs indicating bulletin board systems established by the bulletin board servers 30 respectively include the domain names of the bulletin board servers 30. However, the information items which identify the bulletin board servers 30 and message information items may alternatively be any other information items than domain names and URIs.

The information management server 40 provides users of the mobile communication terminals 50 with a virtual space as a spot for making communication through avatars, and also provides a virtual space for providing information for users of the bulletin board servers 30. The information management server 40 also functions as a Web server. The information management server 40 has a structure as shown in a block diagram of FIG. 4. That is, the information management server 40 has a controller 41, a storage unit 42, and a communication unit 43.

The controller 41, storage unit 42, and communication unit 43 respectively have similar structures to those of the controller 31, storage unit 32, and communication unit 33. However, data stored in the storage unit 42 differs from that stored in the storage unit 32. The storage unit 42 stores a map file, a display data set, a relevant Term table TB2, a user management table TB3, a bulletin board management table TB4, and a board information management table TB5, in addition to programs executed by the controller 41.

Data stored in the storage unit 42 will now be described in detail. At first, the map file is a collection of data items which express a virtual space. The map file includes object data sets, position information items, and path information items. The object data sets each define a shape and color or, in other words, an outer appearance of an object such as a building or a road which forms part of the virtual space. The position information items are information based on a predetermined coordinate system, and respectively define positions on the virtual space. This embodiment utilizes an orthogonal coordinate system on which positions are defined as coordinates on x-, y-, and z-axes which are orthogonal to each other. Each of the path information items is data which defines a place which can become a route (or a path) for avatars in the virtual space. An example of a place defined by a path information item is a road.

The position of each of the objects defined by object data sets is specified by a position information item. That is, the objects are respectively associated with positions indicated by position information items. The objects defined by object data sets are limited to static objects each of which is fixed to a position in the virtual space, but do not include dynamic objects such as avatars.

The display data set mentioned above describes an outer appearance of a bulletin board system in the virtual space. The display data set expresses an image which functions as an entrance to a bulletin board system, and a function as a link is allocated to the display data set. The display data set appears, for example, like a signboard. The display data set naturally needs only to inform users of the mobile communication terminals 50 of the existence of an entrance to the bulletin board system, and is therefore not limited to the outer appearance as described above. The display data set is associated with a predetermined position in the virtual space, and accordingly appears at a predetermined position in the virtual space.

The relevant Term table TB2 describes association between terms and expressions which can be respectively replaced with the terms (such as synonyms, i.e., words having equal meanings or similar meanings). As shown in the figure, the relevant Term table TB2 is a collection of records each including three fields which respectively correspond to three columns "Term ID", "Term", and "Relevant Term ID". These fields each represents content as follows.

The field "Term ID" stores a value (ID) which uniquely identifies a term. This value is an arbitrary digit string which does not overlap between records. The field "Term" includes a value expressing a term. The value in this field is also expressed as predetermined code information such as a character code, such as in the fields "Title" and "Body". The field "Term ID" stores one or plural values which are compatible with the field "Term ID"

Meanings expressed by each record in the relevant term table TB2 will now be described referring to a specific example. In the record in the first line of the relevant term table TB2 shown in FIG. 5, the field "Term" includes a value of "motion picture", and the field "Term ID" includes values of "2", "3", and "5". That is, terms relevant to "motion picture" are "theater", "cinema", and "movie" which are respectively associated with the values "2", "3", and "5".

The user management table TB3 is a table which describes users who have posted message information items, and properties of the users. FIG. 6 shows an example of the user management table TB3. As shown in the figure, the user management table TB3 is a collection of records each including fields which respectively correspond to two columns of "User ID" and "User property". Each of the fields includes content as follows.

In the field "User ID" a value is stored which is compatible with a value in the field "User ID" in the posting management table TB1. In the field "User property" values are stored which respectively correspond to records stored for users. Though there are various indices indicating user properties, in this embodiment the value in the field "User property" indicates a reliability of a user. More specifically, reliability of a user is classified into one of five levels indicated as values of 1 to 5. The greater the value is, the more reliable the user is. The reliability of a user is calculated depending on a posting count indicating how many postings the user carries out. The indicated reliability of a user may be increased or decreased in accordance with a predetermined rule.

The bulletin board management table TB4 is a table for totally managing bulletin board systems installed in the information providing system 100. FIG. 7 shows an example of the bulletin board management table TB4. As shown in the figure, the bulletin board management table TB4 is a collection of records each including fields which respectively correspond to five columns "Bulletin board ID", "Position information ID", "Display data", "Address information", and "First keyword". Each of the fields represents content as follows.

The field "Bulletin board ID" stores a value (ID) which uniquely identifies a bulletin board system. This value is an arbitrary digit string which does not overlap between records. The field "Position information" stores a value indicating a display position of a display data set in the virtual space. This value is described as coordinates on x-, y-, and z-axes, like position information items in the map file. The field "Display data" stores a value indicating a site location (address) of a display data set in the storage unit 42.

The field "Address information" stores a value indicating a site location of a bulletin board system associated with a record including the value. In this embodiment, this value is a URI which users of the mobile communication terminals 50 use to browse an associated bulletin board system. The field "First keyword" stores a value expressing a term which is a keyword for a bulletin board system. The value in this field is expressed by predetermined code information such as a character code as in the field "Term" in the relevant term table TB2. The keyword for a bulletin board system is a term representing a matter which the bulletin board system picks up as a subject. For example, a bulletin board system which deals with information concerning motion pictures is associated with a keyword such as "cinema".

Figures 8, 9:
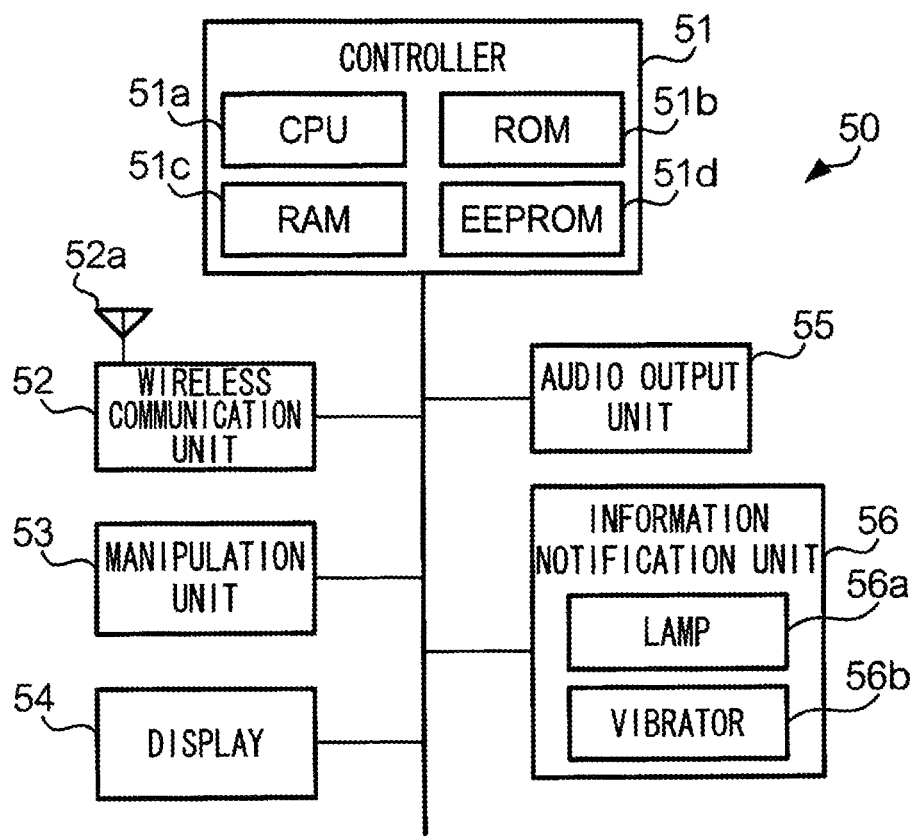
FIG. 8 shows an example of a message information management table.
FIG. 9 is a block diagram showing a structure of a mobile communication terminal.

The message information management table TB5 is a table for totally managing message information items posted to plural bulletin board systems. FIG. 8 shows an example of the message information management table TB5. As shown in the figure, the message information management table TB5 is a collection of records each including fields which respectively correspond to three columns "Bulletin board ID", "Bulletin Board Information ID", "User ID", and "Second keyword". Each of the fields has content as follows.

The field "Bulletin board ID" stores a value which is compatible with the field "Bulletin board ID" in the bulletin board management table TB4. That is, the bulletin board management table TB4 and the message information management table TB5 are associated with each other by the field "Bulletin board ID". The field "Message information ID" stores a value which is compatible with the field "Message information ID" in the posting management table TB1. The field "User ID" stores a value which is compatible with the field "Bulletin board ID" in the user management table TB3. That is, the user management table TB3 and the message information management table TB5 are associated with each other by the field "User ID". The field "Second keyword" stores a value expressing a term which is a keyword for a message information item. The keyword for a message information item is a term which serves as an index of the message information item. The term which serves as an index of a message information is extracted by a known method such as a morphological analysis. For example, if a bulletin board system mainly deals with information concerning motion pictures, each of the keywords for message information items associated with the bulletin board system can include a professional term relating to motion pictures, such as a title of a particular motion picture, a name of an actor/actress, or a genre of a motion picture (e.g., comedy or action).

The mobile communication terminals 50 are communication terminals which communicate via avatars in the present system. In the present embodiment, the mobile communication terminals 50 are assumed to be mobile phones. The mobile communication terminals 50 each have a structure as shown in FIG. 9. That is, the mobile communication terminals 50 each include a controller 51, a wireless communication unit 52, a manipulation unit 53, a display 54, an audio output unit 55, and an information notification unit 56.

The controller 51 includes a CPU 51a, a ROM 51b, a RAM 51c, and an EEPROM (Electronically Erasable and Programmable ROM) 51d. The CPU 51a executes programs stored in the ROM 51b and the EEPROM 51d by using the RAM 51c as a work area, to control respective parts of the mobile communication terminal 50. The wireless communication unit 52 has an antenna 52a and transmits/receives data to/from the mobile packet communication network 20. The manipulation unit 53 has manipulators such as buttons, and supplies the controller 51 with manipulation signals in response to manipulations of a user. The display 54 is a display device which has a liquid crystal panel and a liquid crystal drive circuit. The display 54 displays a variety of information in accordance with instructions received from the controller 51. The audio output unit 55 has a loudspeaker, and outputs sounds in accordance with audio signals supplied from the controller 51. The information notification unit 56 has a lamp 56a and a vibrator 56b, and notifies the user of information by any method other than display on the display 54 and sounds output from the audio output unit 55. The lamp 56a causes a light source to turn on in accordance with an instruction from the controller 51. The vibrator 56b causes the motor to generate a vibration in accordance with an instruction from the controller 51.

Figure 10:
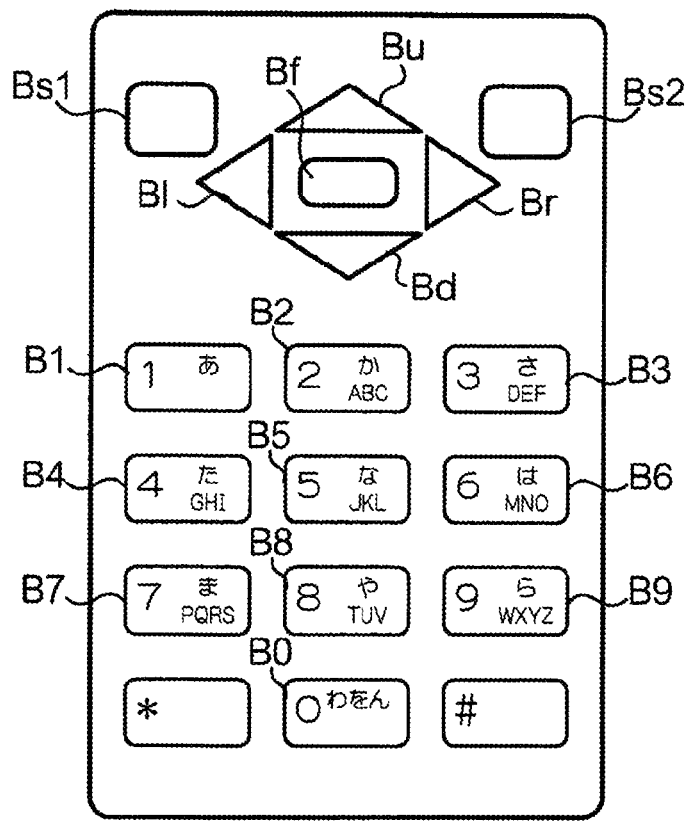
FIG. 10 shows an example of manipulators included in a manipulation unit of the mobile communication terminal.

The manipulators of the manipulation unit 53 will now be described with reference to FIG. 10. As shown in the figure, the manipulation unit 53 includes soft buttons Bs1 and Bs2, move buttons Bu, Bd, Bl, and Br, an enter button Bf, and dial buttons B1 to B0. The soft buttons Bs1 and Bs2 are assigned with predetermined functions associated with screen display on the display 54. The functions assigned to the soft buttons Bs1 and Bs2 will be described later. The move buttons Bu, Bd, Bl, and Br are to move an object to be moved, in forward, backward, leftward, and rightward directions (or in upward, downward, leftward, and rightward directions). The enter button Bf is to select an object displayed on the display 54 and to fix content of a processing to be executed thereafter. The dial buttons B1 to B0 are to input terms.

Further, content of data stored in each of the mobile communication terminals 50 will now be described. The ROM 51b prestores several programs. In the following, the programs will be referred to as "preinstalled programs". Specifically, the preinstalled programs are a multitask operating system (hereinafter "multitask OS"), a Java (registered trade mark) platform, and native applications. These programs will now be described in detail.

First, the multitask OS is an operating system which supports various functions including, for example, assignment of virtual memory areas which are required for performing pseudo parallel execution of multiple tasks based on a TSS (Time-Sharing System). The Java platform is a group of programs which are described so as to comply with a CDC (Connected Device Configuration) as a configuration for establishing a Java execution environment 514 in a mobile device using a multitask OS. The native applications are programs for providing basic services for the mobile communication terminals 50, such as telephone conversations, browsing, and transmission/receptions of e-mails. The native applications include a mailer application for executing an e-mail transmission/reception service, and a browser application for executing a browsing service.

The EEPROM 51d has a Java application storage area where Java applications are stored. The Java applications each include a JAR file (Java Archive) file and an ADF (Application Descriptor File). The JAR file combines program modules and image and/or audio files together. The program modules describe processing procedures in the Java execution environment 514, and the image and/or audio files are used when the program modules are executed. The ADF describes various properties concerning installation and activation of the JAR file. Java applications are created by content providers or carriers, and are stored into server devices on the Internet 10. In response to requests from the mobile communication terminals 50, Java applications are downloaded from the server devices.

Figure 11:
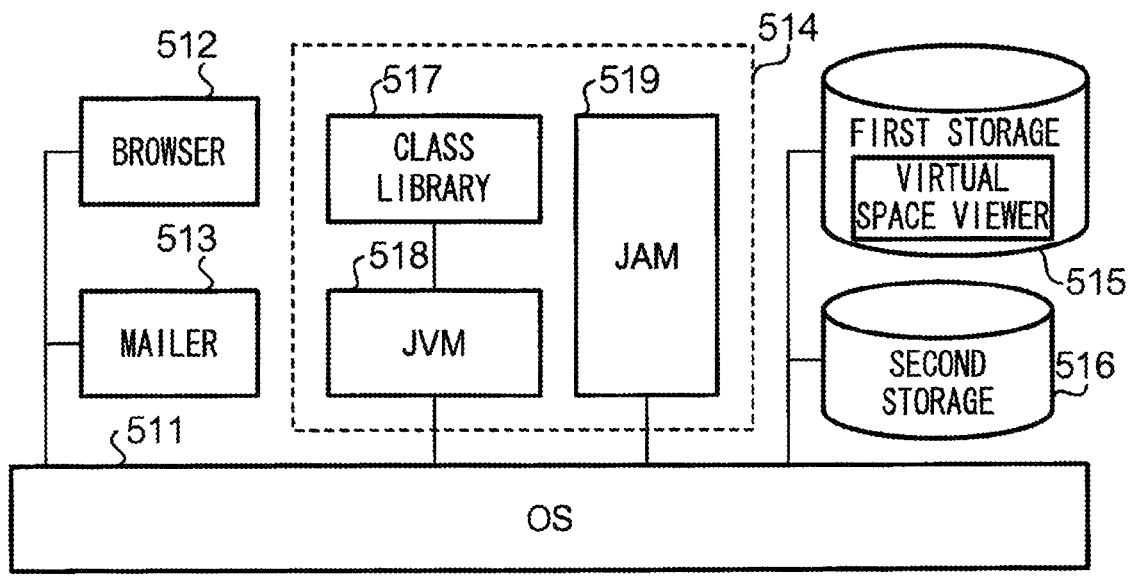
FIG. 11 shows a logical structure of units established by the controller of the mobile communication terminal.

FIG. 11 shows a logical configuration of respective parts established as the controller 51 of each mobile communication terminal 50 executes various programs in the ROM 51b and the EEPROM 51d. As shown in the figure, each mobile communication terminal 50 constructs a browser 512, a mailer 513, and a Java execution environment 514 on an OS 511 by executing various programs. A first storage 515 and a second storage 516 are maintained in the EEPROM 51d. The browser 512 and the mailer 513 are established by native applications in the ROM 51b and perform functions of receiving and interpreting data described in an HTML format and a format compatible with the HTML format, and functions of transmitting and receiving e-mails.

The Java execution environment 514 is established by the Java platform in the ROM 51b. The Java execution environment 514 is constituted of a class library 517, a JVM (Java Virtual Machine) 518, and a JAM (Java Application Manager 519). The class library 517 combines a group of program modules (i.e., classes) having a particular function into one file. The JVM 518 is an optimized Java execution environment for the CDC described previously, and interprets and executes byte codes which are provided as a Java application. The JAM 519 functions to manage downloading, installation, and startup/termination of the Java application.

The first storage 515 is an area for storing a Java application (e.g., a Jar file and an ADF) downloaded under management of the JAM 519. The second storage 516 is an area for storing data after termination of a Java application if data is generated during execution of the Java application. Individual storage areas are allocated to installed Java applications, respectively. Data in a storage area allocated to a Java application is rewritable only while the Java application is being executed. Accordingly, data in a storage area allocated to a Java application cannot be rewritten by any other Java application.

The Java application includes an application for posting, browsing, and searching for message information items in response to instructions from users. This application will be hereinafter referred to as a "virtual space viewer". In this embodiment, the virtual space viewer is prestored in each mobile communication terminal 50.

Described further will be operations of the bulletin board servers 30, information management server 40, and mobile communication terminals 50 in the information provided system 100. First, processings executed by the bulletin board servers 30, information management server 40, and mobile communication terminals 50 will be described in a case where a user of a mobile communication terminal 50 posts a message information item. Described next will be processings executed by the information management server 40 and the mobile communication terminals 50 in a case where a user of a mobile communication terminal 50 searches message information items.

When a user of a mobile communication terminal 50 decides to post a message information item, the user first starts up a virtual space viewer. To start up the virtual space viewer, the user carries out a predetermined manipulation on the manipulation unit 53. The mobile communication terminal 50 accepts this manipulation, and the controller 51 then starts up the virtual space viewer.

Figure 12:
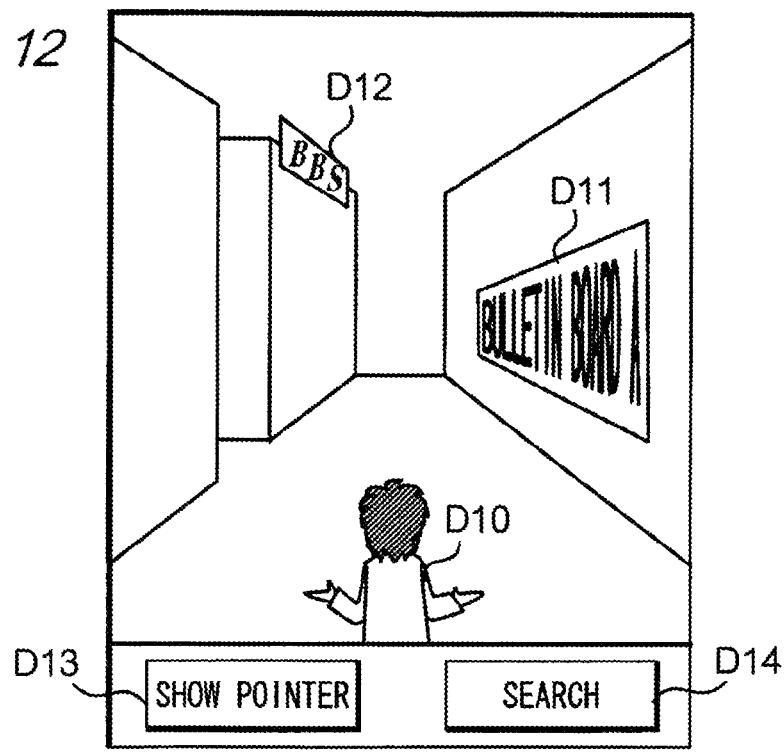
FIG. 12 shows an example of a screen image displayed by a display of the mobile communication terminal.

FIG. 12 shows a screen image displayed on the display 54 after the virtual space viewer is started up. A part of the virtual space viewer and an avatar are displayed in a view observed nearly from a viewpoint of the avatar. Information which is a basis for this screen image is obtained from an information providing server 30 when the virtual space viewer is started up. In the figure, an image D10 depicts an avatar from the back side of the avatar. The image D10 moves in a virtual space in accordance with instructions received from the user. The avatar is movable only in directions which are defined by path information items. Images D11 and D12 are images each corresponding to a display data set described previously and are respectively linked to associated bulletin board systems. Images D13 and D14 depict functions which are respectively assigned to the soft buttons Bs1 and Bs2. The example of the figure shows that the soft button Bs1 is assigned with a function of switching show/hide of a pointer, and the soft button Bs2 is assigned with a function of searching message information items in the virtual space.

If the user presses down move buttons Bu, Bd, Bl, and Br in this state, the controller 51 varies displayed content of the display 54 so as to change the position of the avatar in the virtual space. For example, if the user presses down the move button Bu in the state shown in FIG. 12, the avatar moves forward. At this time, the controller 51 transmits information indicating the position and orientation of the avatar to the information management server 40 at a predetermined timing. The controller 51 further receives object data sets which are positioned within a predetermined range from the moved position of the avatar.

Figure 13:
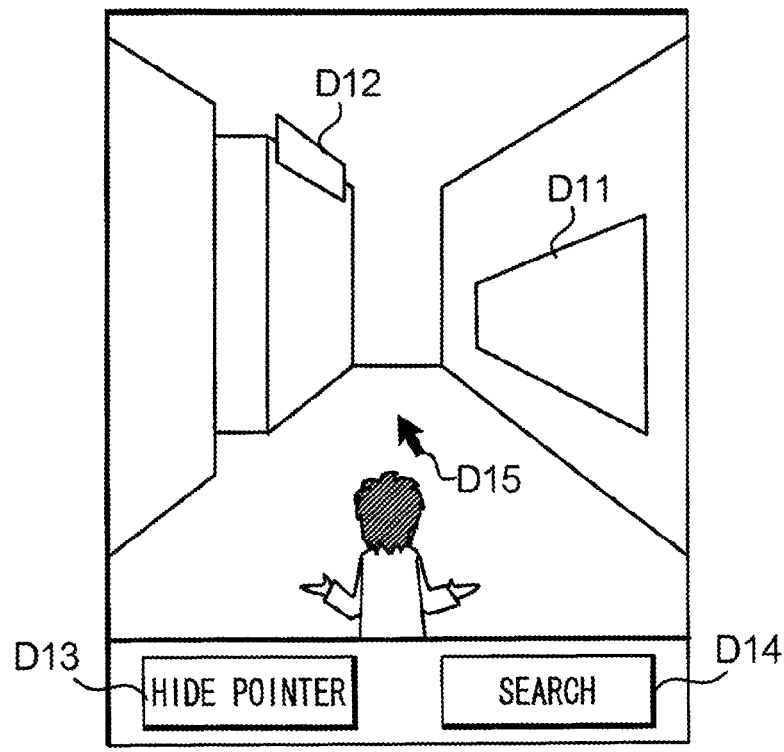
FIG. 13 also shows an example of a screen image displayed by the display of the mobile communication terminal.

To access a bulletin board system, the user of the mobile communication terminal 50 selects an image associated with a desired bulletin board system, by use of a pointer. To cause a pointer to be displayed, the user presses down the soft button Bs1. If the soft button Bs1 is pressed down, the controller 51 then changes displayed content of the display 54 as shown in FIG. 13. In this figure, an image D15 expressing an arrow indicates the pointer. If the user presses down any of the move buttons Bu, Bd, Bl, and Br when the pointer is displayed, the controller 51 changes displayed content of the display 54 so that the position of the pointer changes depending on the button which is pressed down. That is, the move buttons Bu, Bd, Bl, and Br function as manipulators to move an avatar while the pointer is hidden. These buttons thus function as manipulators to move the pointer while the pointer is displayed. If the enter button Bf is pressed down while the pointer is located over an image associated with the desired bulletin board system, the controller 51 accesses the associated bulletin board system, and causes the display 54 to show a page for browsing message information items.

Figure 14:
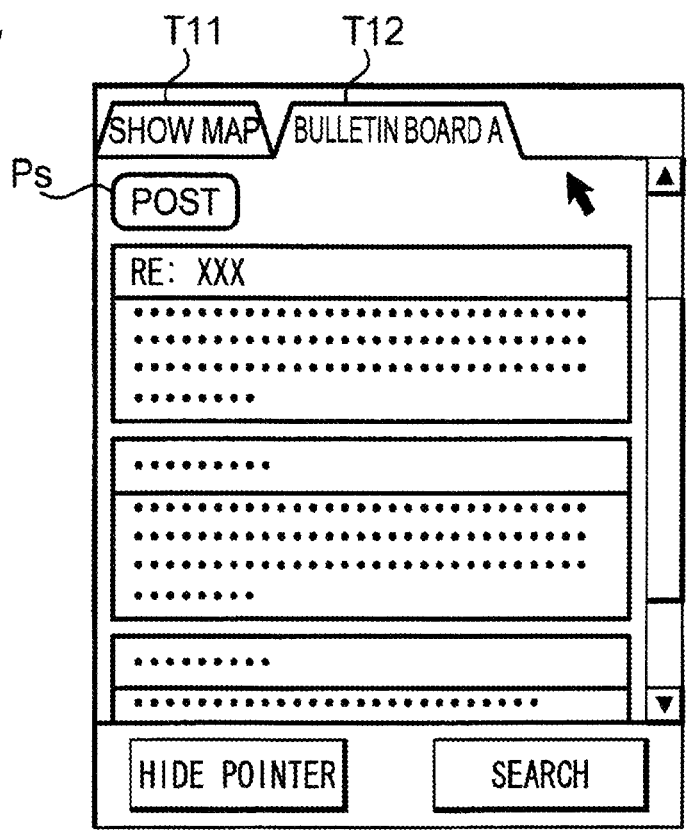
FIG. 14 also shows an example of a screen image displayed by the display of the mobile communication terminal.

FIG. 14 shows an example of a page for browsing message information items. On this page, plural message information items stored in the bulletin board system are shown in a predetermined order. As shown in the figure, when the page for browsing a message information item is displayed, tabs T11 and T12 are shown up at an upper portion of a screen image. The user can switch displayed content between a virtual space and message information items by selecting any of the tabs T11 and T12. At this time, the controller 51 already stores an image expressing a virtual space and an image showing message information items in the RAM 51*c*. The controller 51 causes the display 54 to show any of the screen images selected by the user.

At this time, the user of the mobile communication terminal 50 can post a new message information item to the bulletin board system. To post a new message information item, the user needs only to select a post button Ps shown in FIG. 14 by using the pointer or the like. When the post button Ps is selected, the mobile communication terminal 50 then transmits a request for posting a message information item to a bulletin board server 30. The following will specifically describe processings triggered by selection of the post button Ps.

FIG. 15 is a sequence chart showing a series of processings related to posting of a message information item. The following description will be made in line with this figure. At first, the controller 51 of a mobile communication terminal 50 transmits, to a bulletin board server 30, a request for posting of a message information item (step Sa1). Upon receiving this request, the controller 31 of the bulletin board server 30 transmits data expressing a page for inputting a message information item to the mobile communication terminal 50 (step Sa2). This page includes, for example, areas (such as text boxes) for inputting items corresponding to fields "User ID", "Title", and "Body" of the posting management table TB1.

Upon receiving the data from the bulletin board server 30, the controller 51 of the mobile communication terminal 50 causes the display 54 to show a page corresponding to the received data, and accepts input of a message information item from the user (step Sa3). After information necessary for the message information item is inputted, the controller 51 of the mobile communication terminal 50 transmits the input message information item to the bulletin board server 30 (step Sa4).

Upon receiving the input message information item, the controller 31 of the bulletin board server 30 generates a new record on the posting management table TB1, on the basis of the received message information item (step Sa5). In this case, the value in the field "Posting time" on the posting management table TB1 is determined based on a time point when the message information item is received. Further, the value in the field "Viewing count" in the posting management table TB1 is set to an initial value (e.g., "0"). Subsequently, the controller 31 extracts a term which is proper as a keyword from the input message information item (step Sa6). As described previously, this keyword serves as an index for the message information item and is extracted by a known method such as a morphological analysis.

After generating a new record and extracting a keyword, the controller 31 of the message information server 30 transmits the value in the field "Message information ID" of the record and the extracted keyword to the information management server 40 (step Sa7). At this time, the controller 31 transmits a value (e.g., a bulletin board ID or URI) together, which uniquely identifies the bulletin board system associated with the bulletin board server 30. The controller 41 of the information management server 40 generates a new record on the message information management table TB5 on the basis of received data such as the aforementioned values (step Sa8).

Through processings executed as described above, the message information item posted by the mobile communication terminal 50 is registered in the bulletin board server 30 so that the message information item can be browsed from other mobile communication terminals 50. Also through the processings executed as described above, the information management server 40 recognizes what kind of message information item is posted to which bulletin board system. Accordingly, the information management server 40 can then respond to a search request from the mobile communication terminals 50, which will be described later.

A further description will be made of a case where a user of a mobile communication terminal 50 searches for a desired message information item. To search for a message information item, the user needs to press down the soft button Bs2 when any of screen images shown in FIGS. 12 to 14 is displayed on the display 54. If a manipulation signal associated with the soft buttons B1 is supplied, the controller 51 of the mobile communication terminal 50 performs a processing as follows, triggered by the supplied manipulation signal.

Figure 16:
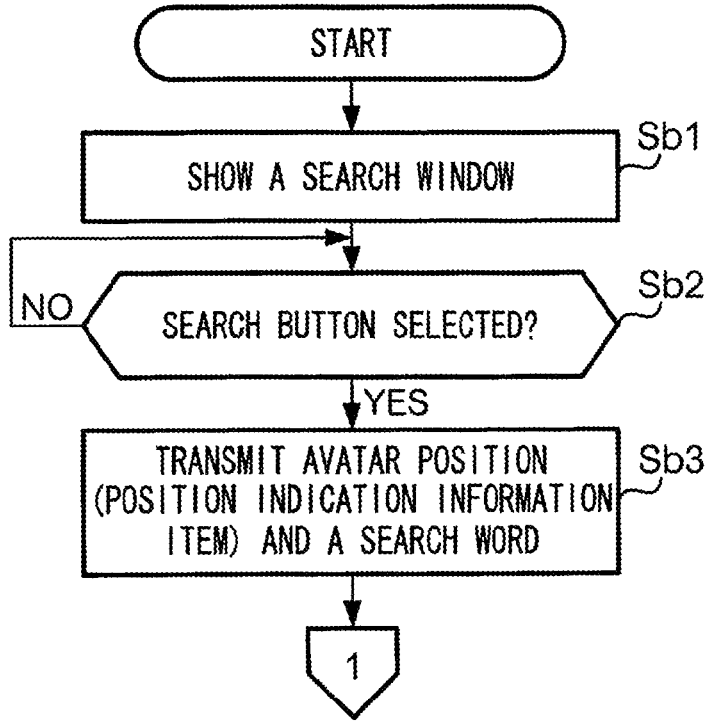
FIG. 16 is a flowchart showing processings executed by the controller of the mobile communication terminal.

FIG. 16 is a flowchart showing the processing which the controller 51 executes when the soft button Bs2 is pressed down. As indicated in the flowchart, the controller 51 first causes the display 54 to show an object (window) for specifying a term (hereinafter a "search word") to allow a user to search for a message information item. This object will be hereinafter referred to as a "search window".

FIG. 17 shows an example of a screen image which the controller 51 causes the display 54 to display. As shown in the figure, the controller 51 causes the display 54 to display a search window Sw in front of (or over) the screen image which has been displayed. The search window Sw includes a text box Tb and a search button Sb. The text box Tb is an object for allowing the user to input a search word. The user selects the text box Tb and presses down dial buttons B1 to B0. Then, characters associated with the pressed dial buttons are displayed in the text box Tb by the controller 51. The controller 51 temporarily stores the characters. When the user selects the search button Sb by use of the pointer, the controller 51 then specifies, as a search word, a term displayed in the text box Tb and a at this time.

FIG. 16 will now be referred to again. After displaying the search window, the controller 51 waits until a search button is selected by the user. Specifically, the controller 51 repeatedly determines whether or not a search button is selected (step Sb2). If the search button is selected (step Sb2: YES), the controller 51 transmits, to the information management server 40, information indicating the position of the avatar and the search word (step Sb3). This information indicating the position of the avatar indicates coordinates of the position of the avatar; namely, position information. This position information will be hereinafter referred to as a "position indication information item", for the purpose of distinguishing this position information item from other position information items, which are also transmitted from the controller 51.

Figure 18:
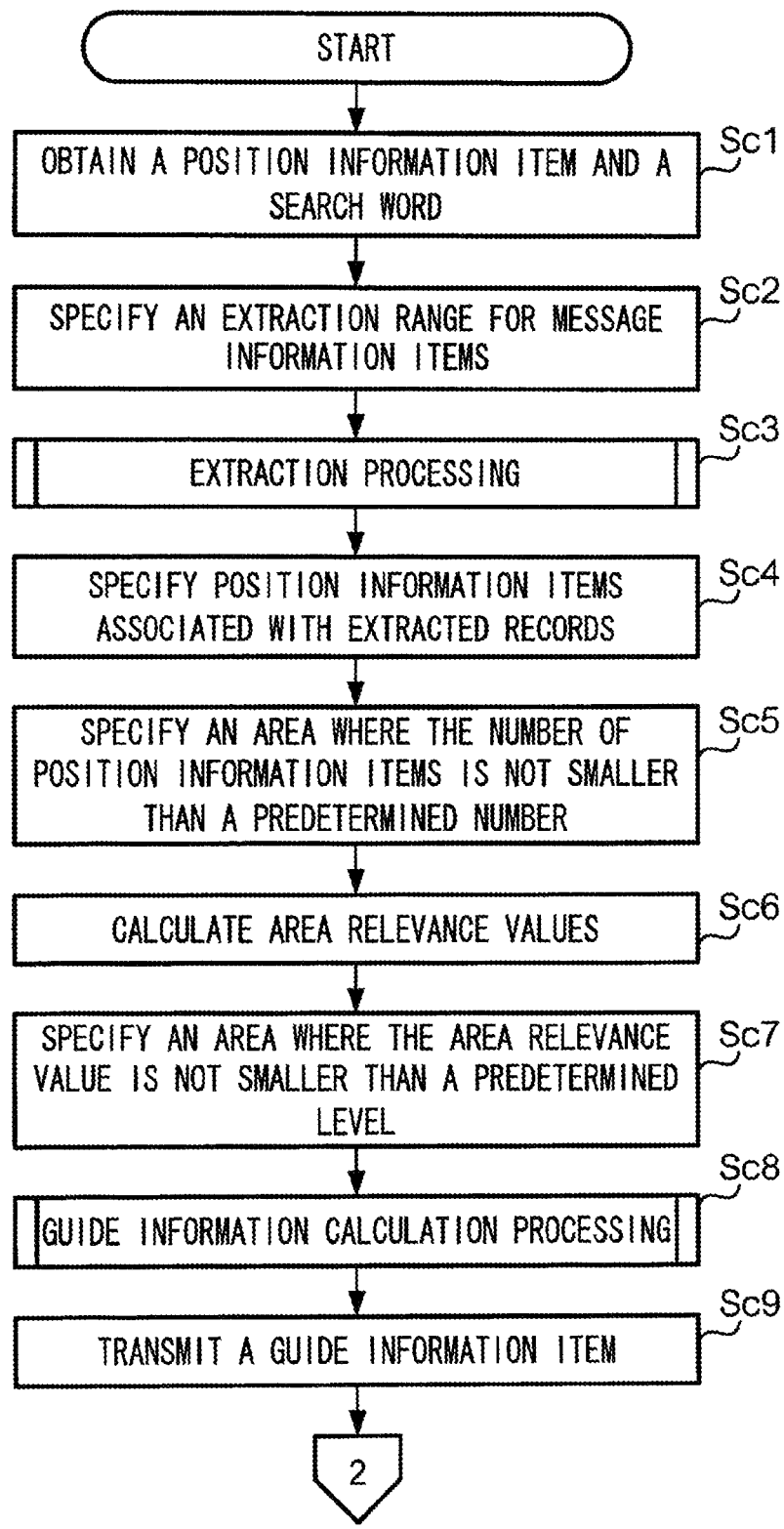
FIG. 18 is a flowchart showing processings executed by a controller of the information management server.

Upon completion of the processings as described above, the mobile communication terminal 50 waits for a response from the information management server 40. The information management server 40 executes a search processing for searching message information items, based on the position indication information item and the search word which the mobile communication terminal 50 has transmitted. FIG. 18 shows a flowchart of processings executed by the controller 41 of the information management server 40. Hereinafter, operations of the information management server 40 will be described with reference to the flowchart.

At first, the controller 41 of the information management server 40 obtains the position indication information item and the search word transmitted from the mobile communication terminal 50 by the communication unit 43 (step Sc1). Subsequently, the controller 41 specifies a range around a center of the position indicated by the obtained position indication information item (i.e., around the position of the avatar), as a range from which message information items are extracted (step Sc2). In other words, this processing is to exclude message information items allocated to positions which are separated by at least a predetermined distance from the position of the avatar. This processing is desirably executed when the virtual space is very large, and is not always required.

Next, the controller 41 performs a processing for extracting a record having keywords relevant to the obtained search word from the message information management table TB5 (step Sc3). This processing will be hereinafter referred to as an "extraction processing". In the extraction processing, the controller 41 specifies records each of which includes relevant keywords, even if the keywords each are not perfectly identical to the obtained search word. The keywords in this extraction processing include a keyword (a second keyword) for message information items and a keyword for a bulletin board system (a first keyword).

Figure 19:
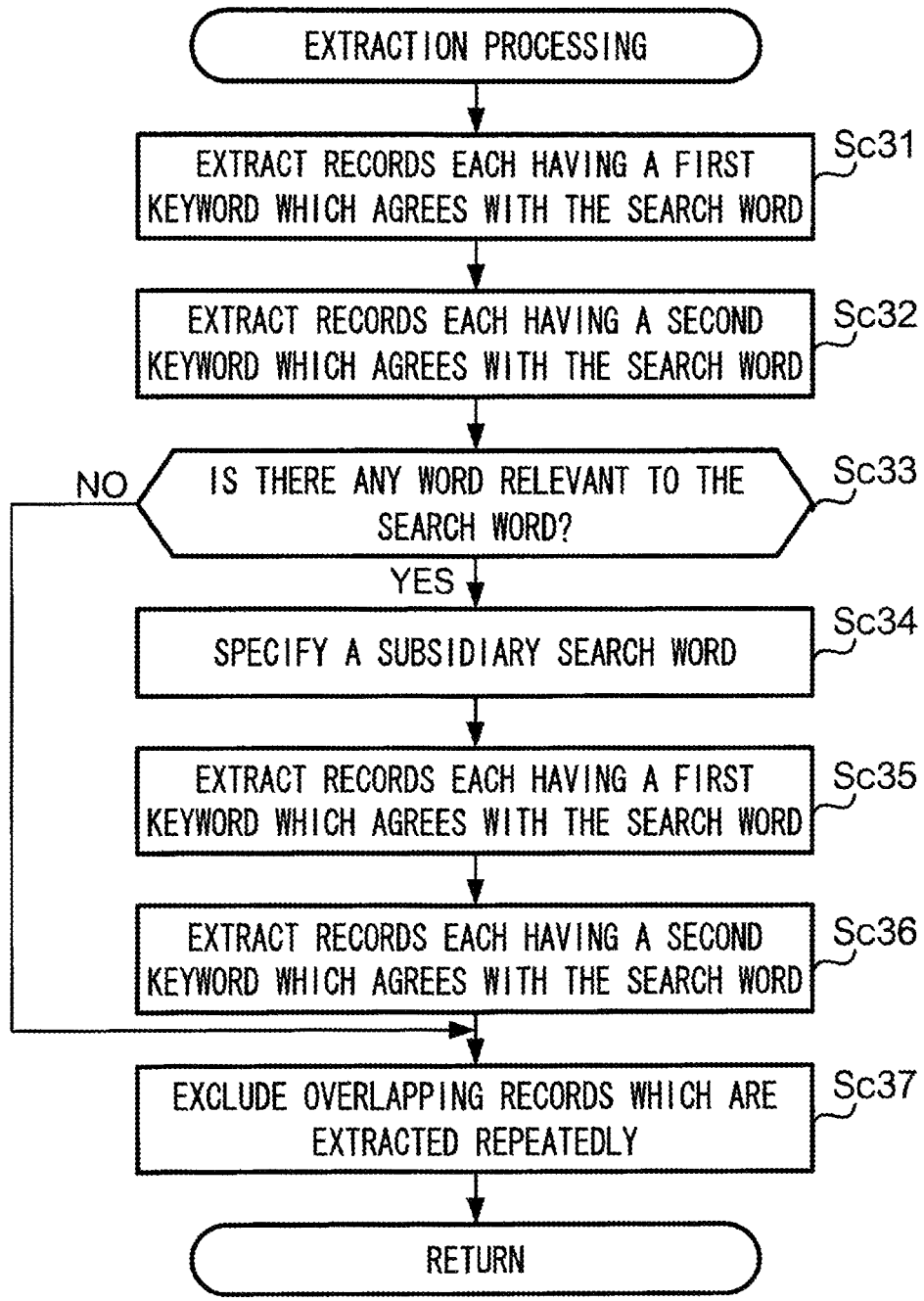
FIG. 19 is a flowchart showing an extraction processing executed by the controller of the information management server.

FIG. 19 is a flowchart showing an extraction processing. The following description will be made with reference to the flowchart. At first, the controller 41 extracts records each including a keyword (first keyword) for a bulletin board system, which agrees with the search word, by referring to the bulletin board management table TB4 and the message information management table TB5 (step Sc31). Specifically, the controller 41 extracts records in each of which the value in the field "First keyword" agrees with the obtained search word, from the bulletin board management table TB4. The controller 41 further extracts, from the message information management table TB5, records in which values in the field "Bulletin board ID" agrees with values in the field "Bulletin board ID" of the foregoing extracted records. Subsequently, the controller 41 extracts records in each of which a keyword (second keyword) for message information items agrees with the search word (step Sc32).

At this time, the controller 41 determines whether or not there is a record in which the value in the field "Term" indicates a term identical to the search word (step Sc33). If such a term exists (step Sc33: YES), the controller 41 specifies terms indicated by values in the field "Relevant term ID" in the record, and regards the specified terms as being equivalent to the search word (step Sc34). The terms which are regarded as being equivalent to the search word in this manner will now be referred to as "subsidiary search words". If there is no term which serves as a subsidiary search word (step Sc33: NO), the controller 41 omits a processing (steps Sc35 and Sc36) for extracting records on the basis of subsidiary search words.

After specifying subsidiary search words, the controller 41 extracts records in each of which the keyword (first keyword) for a bulletin board system agrees with any of the subsidiary search words, by referring to the bulletin board management table TB4 and the message information management table TB5 (step Sc35). This processing has the same outline as the foregoing processing of the step Sc31. Subsequently, the controller 41 extracts records in each of which the keyword (second keyword) for a message information item agrees with any of the subsidiary search words (step Sc36).

Subsequently, the controller 41 eliminates overlapping records from among the records extracted by the steps Sc31, Sc32, Sc35, and Sc36 (step Sc37). That is, for example, even if one record is extracted repeatedly by the steps Sc31, Sc32, and Sc35, the record should be regarded as one extracted record. The same record is excluded from targets to be subjected to subsequent processings. The extraction processing then ends.

Upon completion of the extraction processing, the controller 41 specifies position information items associated with extracted records (step Sc4). Specifically, the controller 41 refers to the bulletin board management table TB4 and extracts therefrom records in each of which the value in the field "Bulletin board ID" agrees with the value in the field "Bulletin board ID" of any of the extracted records. The controller 41 reads the value in the field "Position information" from each of the extracted records, thereby to specify a position information item associated with each of the extracted records. Each of the position information items specified in this manner indicates a position associated with a message information item associated with one of the records extracted by the extraction processing.

Next, the controller 41 specifies an area where the number of message information items is not smaller than a predetermined number (step Sc5). This means that the number of message information items associated with positions indicated by the specified position information items is specified. The term "area" as used herein, refers to a range of a predetermined size in the virtual space. A relationship in size between areas may be defined in any manner. For example, areas each may be a range of one predetermined size, or users of the mobile communication terminals 50 may be allowed to select any of area sizes which are defined in advance.

A method for specifying an area in the step Sc5 will now be described with reference to an example. For convenience of explanation, the virtual space is interpreted to be a plane, and the height dimension is therefore not considered.

Figure 20:
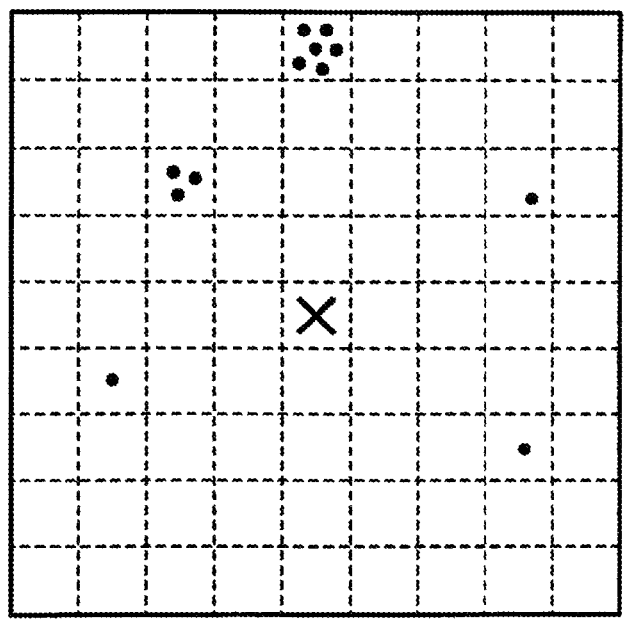
FIG. 20 shows a state in which a virtual space is divided into areas having a predetermined size.

FIG. 20 shows a state in which the virtual space is divided into areas each having one predetermined size. In the figure, a rectangle drawn by continuous lines represents a virtual space as a target from which message information items are extracted. Inside the rectangle, further rectangles drawn by broken lines respectively represent areas. In this figure, "x" denotes a position of an avatar. Each symbol "•" denotes a position indicated by a specified position information item. In fact, plural position information items which indicate the same position can be specified. Such position information items are not shown as overlapped in the figure. The controller 41 counts the number of position information items for each area, as described above, and specifies an area which includes a greater number of specified position information items than a threshold. In this case, plural areas may be specified.

After specifying an area or areas in this manner, the controller 41 calculates a degree of relevance to the search word for the specified area or each of the specified areas (step Sc6). A value which indicates the degree of relevance between an area and a search word will be hereinafter referred to as an "area relevance degree". For each specified area, the controller 41 calculates an area relevance degree by using the number of position information items specified in the step Sc4 and weight information items applied respectively to the specified position information items. In this embodiment, the area relevance degrees are calculated by using reliabilities of users of the mobile communication terminals 50 as the weight information items. A reliability of a user can be specified by reading a value described in the field "User property" in the user management table TB3, based on a value in the field "User ID" for each of the records extracted by the extraction processing.

A method for calculating an area relevance degree will now be described in detail below. For example, the number of position information items specified in the step Sc4 is expressed as n (where n is an integer of 0 or more), and reliabilities of users who posted message information items associated with the n position information items are expressed as $c_i$ (where i=1, 2, . . . , n). The area relevance degree is expressed as $A_{area}$. Then, the area relevance degree $A_{area}$ is obtained by the following expression (1). In this expression, $C_1$ is a predetermined constant.

$$A_{area} = C_1 \sum_{i=1}^{n} c_i \tag{1}$$

After calculating area relevance degrees, the controller 41 specifies areas for each of which the area relevance degree is not smaller than a predetermined level (step Sc7). The areas which are specified at this time are those which the information management server 40 notifies the mobile communication terminal 50 of, i.e., candidates of areas as destinations which the user of the mobile communication terminal 50 should aim at. Further, the controller 41 executes a processing for calculating an information item to show the areas specified in the step Sc7 as a search result to the user of the mobile communication terminal 50 (step Sc8). This processing will be hereinafter referred to as a "guide information calculation processing". The information item calculated at this time will be hereinafter referred to as a "guide information item". Specifically, the guide information item is to guide the user of the mobile communication terminal 50 from a present position (i.e., the position of the avatar) to a specified area in the step Sc7. That is, the guide information item is to cause the mobile communication terminal 50 to show a route from the position of the avatar to a target area (i.e., one of candidate areas as destinations mentioned above). In this embodiment, the guide information item defines an outer appearance of an arrow indicating a route from the position of the avatar to the target area, and is constituted of a "width information item" and an "end point information item".

Figure 21:
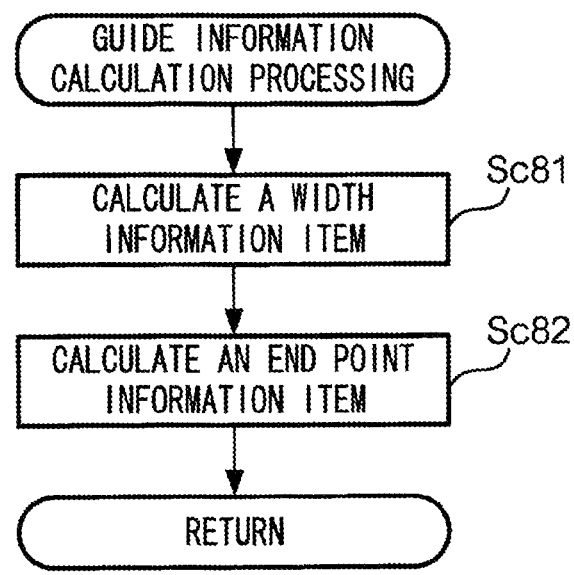
FIG. 21 is a flowchart showing a guide information calculation processing executed by the controller of the information management server.

FIG. 21 is a flowchart showing the guide information calculation processing. The following description will be made with reference to the flowchart. At first, the controller 41 calculates information which defines a width of an arrow indicating a route from the position of the avatar to a target area (step Sc81). The information calculated at this time will be hereinafter referred to as a "width information item". At this time, the controller 41 calculates the width information item, based on the position of the avatar, a predetermined position in a target area, and an area relevance degree of the target area. Specifically, the width information item W is obtained by the expression (2) below, where the thickness information item is expressed as W, coordinates of the position of the avatar are $(x_1, y_1, z_1)$, coordinates of the predetermined position in the target area are $(x_2, y_2, z_2)$, and the area relevance degree is $A_{area}$.

$$W = \frac{A_{area}}{\sqrt{(x_1 - x_2)^2 + (y_1 - y_2)^2 + (z_1 - z_2)^2}} \quad (2)$$

That is, the width information item W is a value obtained by dividing the area relevance degree $A_{area}$ by a distance between the position of the avatar and the predetermined position in the target area. In this case, the predetermined position in the target area may be any position. For example, the predetermined position may be a center of the target area, a boundary of the target area, or a position corresponding to a center among positions indicated by plural position information items associated with records extracted from this area.

After calculating the thickness information item, the controller 41 calculates information which defines end points of the arrow mentioned above (step Sc82). The information calculated at this time will be hereinafter referred to as an "end point information item". At this time, the controller 41 sets the position of the avatar as an end point (which will be hereinafter referred to as a "start point"). That is, the position indicated by the position indication information item obtained from the mobile communication terminal 50 is set as the start point. The controller 41 also calculates another end point (hereinafter referred to as a "termination point"), based on the start point and path information item. Specifically, the controller 41 specifies a route from the start point to the predetermined position in the target area along paths for the avatar, which are defined by path information items. Thereafter, the controller 41 specifies, as the termination point, a position which falls in a predetermined distance from the start point and included in the specified route. In this case, the termination point need not be included in the target area but needs only to indicate a route to go to reach the target area. However, the termination point may naturally be included in the target area.

After calculating the width information item and the end point information item, the controller 41 outputs these items as a guide information item, which is transmitted to the mobile communication terminal 50 through the communication unit 43 (step Sc9). The controller 41 further waits for a response from the mobile communication terminal 50.

Upon obtaining the guide information item from the information providing server 40, the mobile communication terminal 50 displays a predetermined image, based on the guide information item. At this time, the image which is displayed under control of the controller 41 includes information indicating an area where message information items relevant to the search word input by the user are concentrated. At this time, the controller 51 of the mobile communication terminal 50 executes processings shown in a flowchart of FIG. 22. The processings shown in the flowchart are executed subsequently to the processings shown in the flowchart of FIG. 16.

Figure 22:
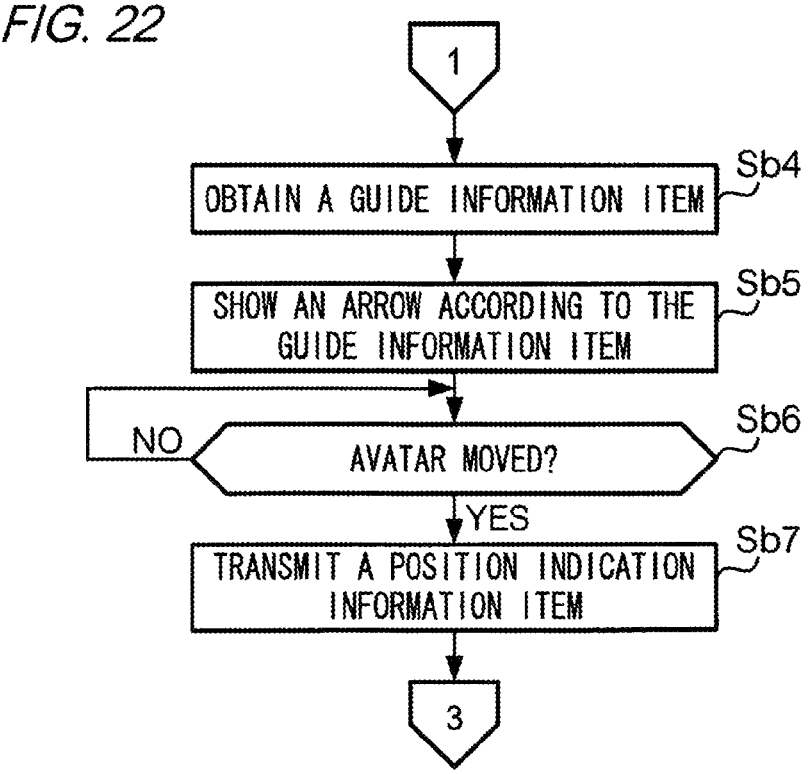
FIG. 22 is a flowchart showing processings executed by the controller of the mobile communication terminal.

As shown in FIG. 22, the controller 51 obtains the guide information item transmitted by the information providing server 40 via the wireless communication unit 52 (step Sb4). Further, the controller 51 displays an image for expressing a virtual space, and shows an object according to the obtained guide information item, in the image for expressing the virtual space (step Sb5). This object is an image of an arrow in this embodiment, and a width and positions of end points of the arrow are specified in accordance with the guide information item.

Figure 23:
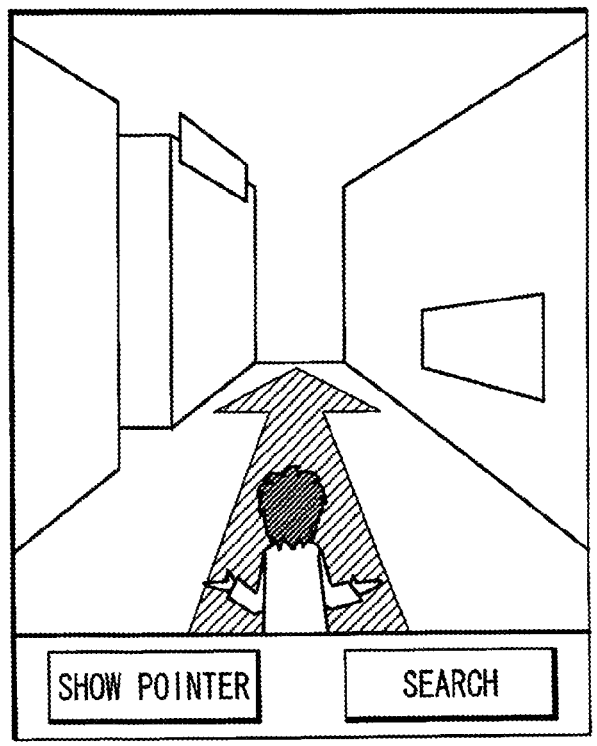
FIG. 23 shows an example of a screen image displayed by the display of the mobile communication terminal.
Figure 24:
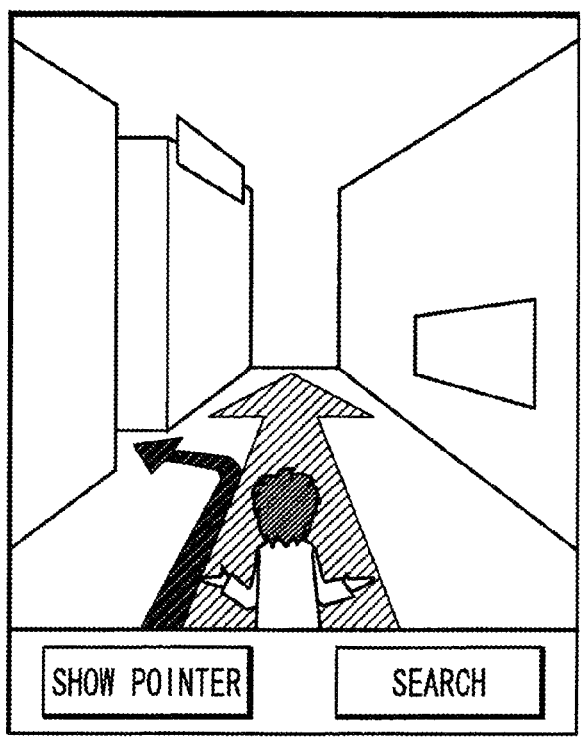
FIG. 24 shows an example of a screen image displayed by the display of the mobile communication terminal.

FIGS. 23 and 24 show examples of images displayed at this time by the display 54. FIG. 23 shows an example of a case where an area corresponding to a search result is in front of an avatar. FIG. 24 shows an example in which plural areas correspond to a search result, and shows that target areas exist in a straight forward direction and in a direction veering to the left. In the latter figure, an arrow pointing in the straight forward direction is shown with a greater width than another arrow pointing in the direction veering to the left. This implies that a target area can be reached faster or a greater number of more relevant information items can be browsed with a higher possibility by following the arrow pointing in the straight forward direction than by following the other arrow pointing in the direction veering to the left.

While displaying these images on the display 54, the controller 51 determines whether the user has instructed the avatar to move (step Sb16). Specifically, the controller 51 repeatedly determines whether or not a manipulation signal associated with the move button Bu, Bd, Bl, or Br has been supplied. If the user has instructed the avatar to move (step Sb6: YES), the controller 51 transmits a position indication information item indicating an instructed position to the information providing server 40 (step Sb7).

Figure 25:
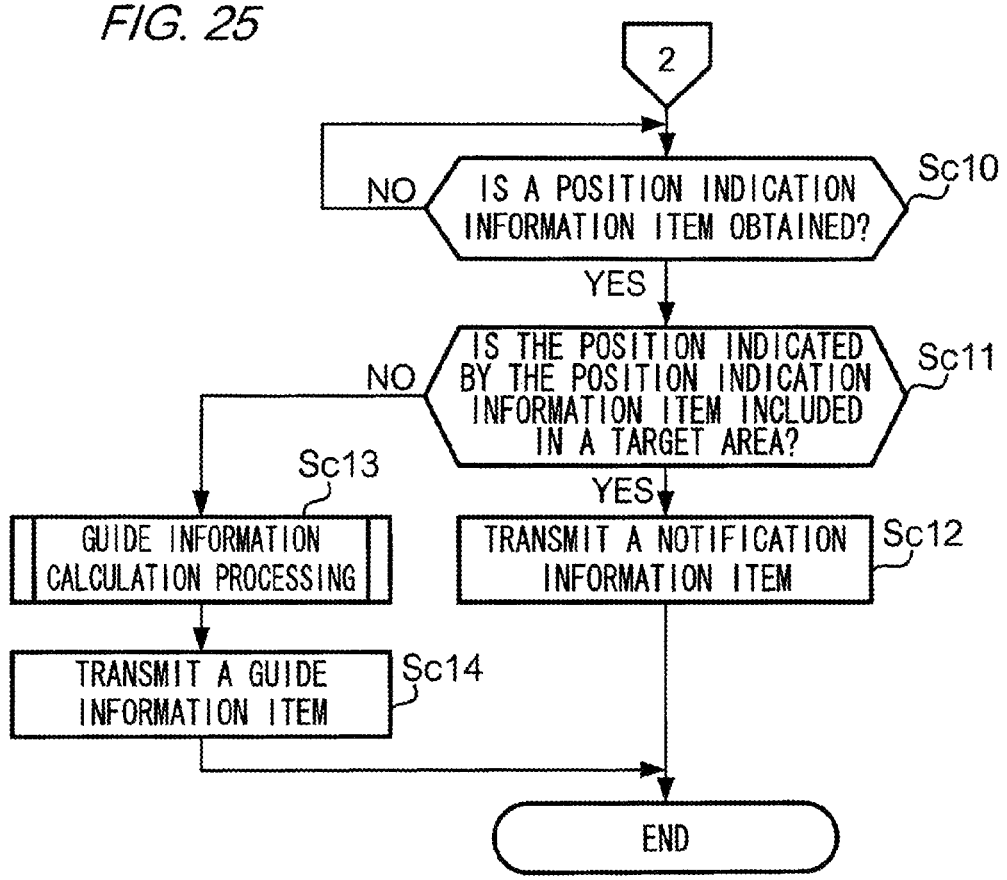
FIG. 25 is a flowchart showing processings executed by the controller of the information management server.

With reference to a flowchart shown in FIG. 25, a description will now be made of a processing which the information management server 40 executes if a position indication information item is received again from the mobile communication terminal 50. The processing shown in the flowchart is executed subsequently to the processing shown in the flowchart of FIG. 18.

After transmitting a guide information item, the controller 41 of the information management server 40 repeatedly determines whether or not a position indication information item has been obtained (step Sc10). That is, the controller 41 repeatedly carries out the determination until the mobile communication terminal 50 transmits a position indication information item as described above. Upon obtaining a position indication information item (step Sc10: YES), the controller 41 determines whether or not a position indicated by the position indication information item is included in an area as a destination which the user aims at (step Sc11).

If the position indicated by the position indication information item is included in the area as a destination which the user of the mobile communication terminal 50 aims at (step Sc11: YES), i.e., if the user of the mobile communication terminal 50 has reached the target area, the controller 41 outputs information which notifies of arrival at the target area. The controller 41 transmits the information to the mobile communication terminal 50 through the communication unit 43 (step Sc12). The information which is output at this time will be hereinafter referred to as a "notification information item". The notification information item includes position information items included in the area, among position information items specified in the step Sc4.

Otherwise, if the position indicated by the position indication information item is not included in the area as a destination which the user aims at (step Sc11: NO), i.e., if the user of the mobile communication terminal 50 has not yet reached the target area, the controller 41 executes again the guide information calculation processing described previously (step Sc13). Further, the controller 41 outputs a calculated guide information item, and transmits the guide information item to the mobile communication terminal 50 through the communication unit 43 (step Sc14).

The processing executed by the mobile communication terminal 50 will now be described again. While the information management server 40 executes the processing shown in the flowchart of FIG. 25, the controller 51 of the mobile communication terminal 50 waits for a response from the information management server 40. Then, the controller 51 performs a processing according to the response received from the information management server 40. In this case, as is apparent from the flowchart shown in FIG. 25, two cases are supposed, i.e., a case that information transmitted from the information management server 40 is a notification information item, and another case that the transmitted information is a guide information item. Therefore, the controller 51 executes a processing, depending on the information received from the information management server 40.

Figure 26:
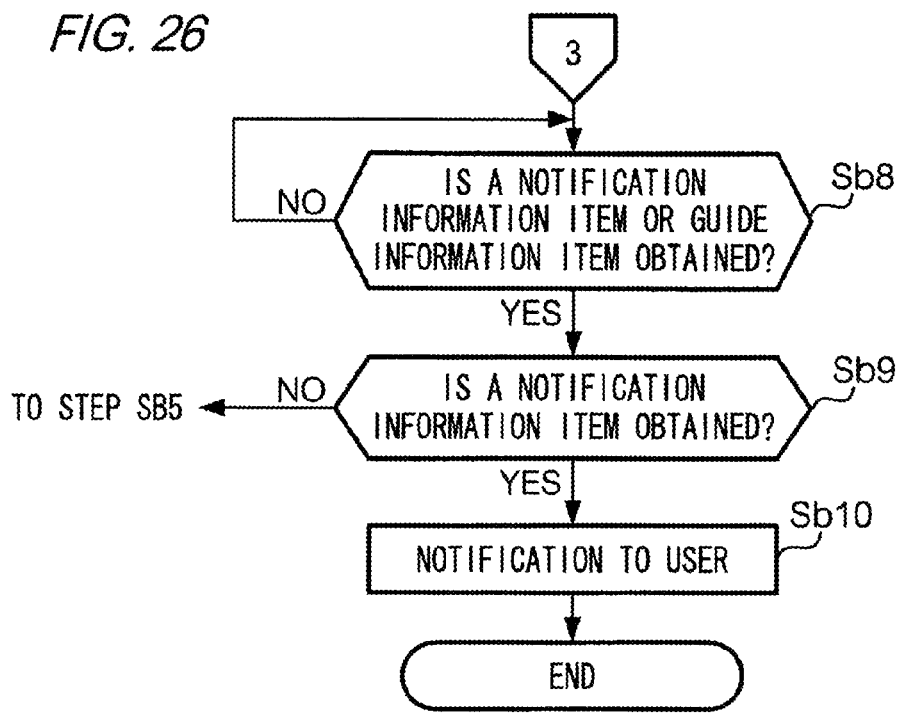
FIG. 26 is a flowchart showing processings executed by the controller of the mobile communication terminal.

FIG. 26 is a flowchart showing a processing executed at this time by the mobile communication terminal 50. The following description will be made with reference to the flowchart. The processing shown in the flowchart is executed by the mobile communication terminal 50, following the processing shown in the flowchart of FIG. 22.

After transmitting a position indication information item to the information management server 40, the controller 51 repeatedly determines whether or not a notification information item or a guide information item has been obtained from the information management server 40 (step Sb8). Further, if a response is obtained from the information management server 40 (step Sb8: YES), the controller 51 determines whether an obtained information item is a notification information item or a guide information item (step Sb9). If the obtained information item is a guide information item (step Sb9: NO), the controller 51 repeats the processings from the step Sb5.

Otherwise, if the obtained information item is a notification information item (step Sb9: YES), the controller 51 executes a processing depending on the obtained notification information item (step Sb10). In brief, the processing is to notify the user of the mobile communication terminal 50 that the avatar has reached a target area. At this time, the controller 51 supplies the information notification unit 56 with an instruction to turn on the lamp 56a or to vibrate the vibrator 56b. Also at this time, the controller 51 hides the image of an arrow which has been displayed up to now.

As has been described above, the information providing server 40 according to this embodiment can use a search word obtained from a mobile communication terminal 50, to specify an area including message information items relevant to the search word. The information providing server 40 can then output a guide information item for guiding the user to the area. Accordingly, the information providing server 40 can allow users of the mobile communication terminals 50 to easily obtain desired information.

Also, the information providing server 40 according to this embodiment specifies an area where there are a number of message information items relevant to the search word, and further calculates a degree of relevance between the area and the search word, based on reliabilities of users who posted the message information items and based on a distance from the position of an avatar to a position as a target position. Accordingly, the user of the mobile communication terminal 50 can obtain desired information by moving a smaller distance, or can have increased opportunities to obtain desired information. Thus, a possibility to obtain more effective information with less labor can be increased.

In addition, the information providing server 40 according to this embodiment does not directly point out positions of desired information items in the virtual space but is configured to suggest a route to reach an area including desired information items. Accordingly, the information providing server 40 allows users of the mobile communication terminals 50 to experience a virtual walk around in the virtual space, looking for desired information items. Thus, information search is provided with additional entertainment value. Routes suggested by the information providing server 40 are indicated by arrows, widths of which vary in accordance with distances to a target area. Users can be thereby excited or stimulated, and thus, searching for information becomes more entertaining.

The information providing server 40 according to this embodiment can notify a user of a mobile communication terminal 50 of plural target areas, and can present degrees of relevance of the plural areas to a search word, respectively as widths of arrows. As a result, a large number of message information items are accumulated in the information providing system 10, and the following effect can be expected. That is, an arrow pointing to an area including a more popular bulletin board system which is visited by more people widens while an arrow pointing to an area including an unpopular bulletin board system narrows. Accordingly, a user who desires general information about a certain field had better move along a wide arrow. In contrast, a user who desires maniac information about a certain field, which only maniac people in the filed would know, may dare to move along a narrow arrow. Thus, the information providing server 40 according to this embodiment can provide users with information in a more entertaining manner.

Second Embodiment

The second embodiment of the invention will now be described. Before describing the second embodiment, differences between this embodiment and the first embodiment will be described in brief.

First, in this embodiment, the virtual space is a space which resembles an actual place (an area in the real world), and the position of an avatar corresponds to an actual position of a mobile communication terminal of a user who manipulates the avatar. This configuration is established by use of a so-called GPS (Global Positioning System). That is, in this embodiment, the avatar does not move in accordance with manipulations of the user of the mobile communication terminal but moves in accordance with actual movement of the user.

Also in this embodiment, message information items are not posted to bulletin board systems but can be posted from wherever the avatar can exist. That is, a user of a mobile communication terminal can post a message information item from or at any desired position while the user moves along with the avatar (i.e., along with the mobile communication terminal). Further, the posted message information item is associated with a position where the avatar existed when the user of the mobile communication terminal posted the message information item. Besides, this embodiment does not employ bulletin board systems, which are not required. In this embodiment, the information management server totally manages all information concerning message information items, which is accumulated in the bulletin board management server 30 in the first embodiment.

Further, this embodiment employs a different method for calculating an area relevance degree from that in the first embodiment described above. Specific differences concerning the method will be described later. Structures and operations of this embodiment will now be described. In the following descriptions of this embodiment, descriptions of the same structures and operations as those of the first embodiment described above will be omitted appropriately. Components in this embodiment, components denoted at the same reference symbols as those in the above first embodiment are the same components as those in the first embodiment.

Figure 27:
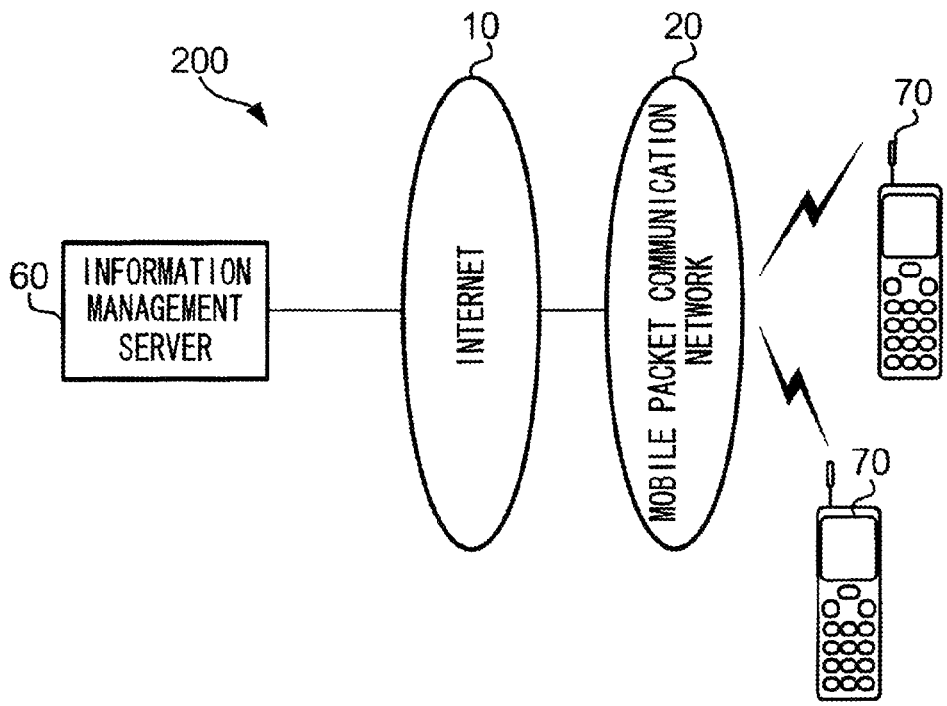
FIG. 27 schematically shows an entire configuration of an information providing system according to a second embodiment of the invention.

FIG. 27 schematically shows an entire configuration of an information providing system 200 according to the second embodiment of the invention. As shown in the figure, the information providing system 200 includes the Internet 10, a mobile packet communication network 20, an information management server 60, and plural mobile communication terminals 70. The Internet 10 and the mobile packet communication network 20 have the same structures as those in the first embodiment.

Figures 28, 29:
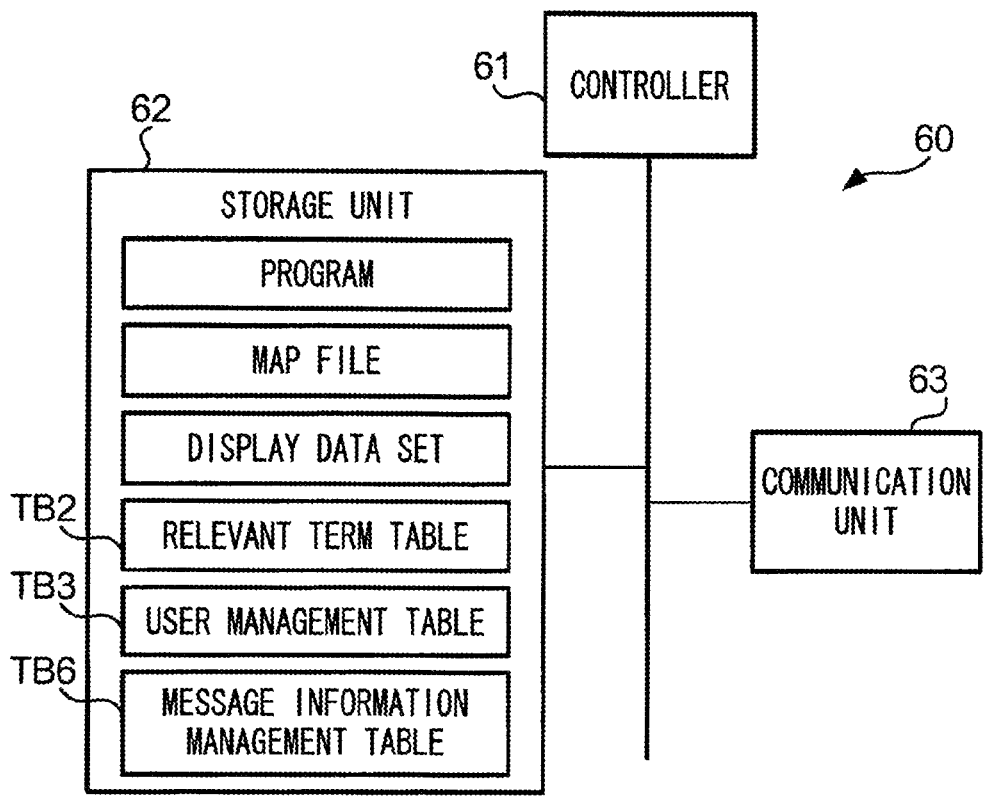
FIG. 28 is a block diagram showing a structure of an information management server.
FIG. 29 shows an example of a message information management table.

FIG. 28 is a block diagram showing a structure of an information management server 60. As shown in the figure, the information management server 60 includes a controller 61, a storage unit 62, and a communication unit 63. The controller 61 and the communication unit 63 have the same structures as those in the first embodiment, respectively. The storage unit 62 is the same as the storage unit 42 in the first embodiment. However, information stored in the storage unit 62 differs from that stored in the storage unit 42. The storage unit 62 stores a map file, a display data set, a relevant term table TB2, a user management table TB3, and a message information management table TB6, in addition to programs executed by the controller 61. The map file is similar to that in the first embodiment. In the second embodiment, however, the map file describes a space which resembles an actual place. Further, regarding position information items according to the map file, coordinates in the x-axis direction correspond to longitudes, and coordinates in the y-axis direction correspond to latitudes. The display data set does not differ between bulletin board systems, but is composed of predetermined images.

FIG. 29 shows an example of the message information management table TB6. As shown in the figure, the message information management table TB6 is a collection of records each including six fields which respectively correspond to six columns "Message information ID", "Position information", "Posting time", "Viewing count", "Title" and "Body". The fields "Message information ID", "Posting time", "Viewing count", "Title" and "Body" store the same data as stored in the same fields in the bulletin board management table TB1 in the first embodiment described above. The field "Position information" stores the same data as stored in the field "Position information" in the bulletin board management table TB4 in the above first embodiment.

In brief, the information management server 60 according to this embodiment is configured to be able to solely perform all the functions which are performed by the bulletin board servers 30 and the information providing server 40 in the first embodiment described above. The information management server 60 according to this embodiment adopts a configuration in which message information items are extracted without using keywords (first and second keywords) since message information items are not independently managed by individuals of bulletin board systems but are totally managed by the information management server 60. A processing to be executed when extracting message information items will be described later.

Figure 30:
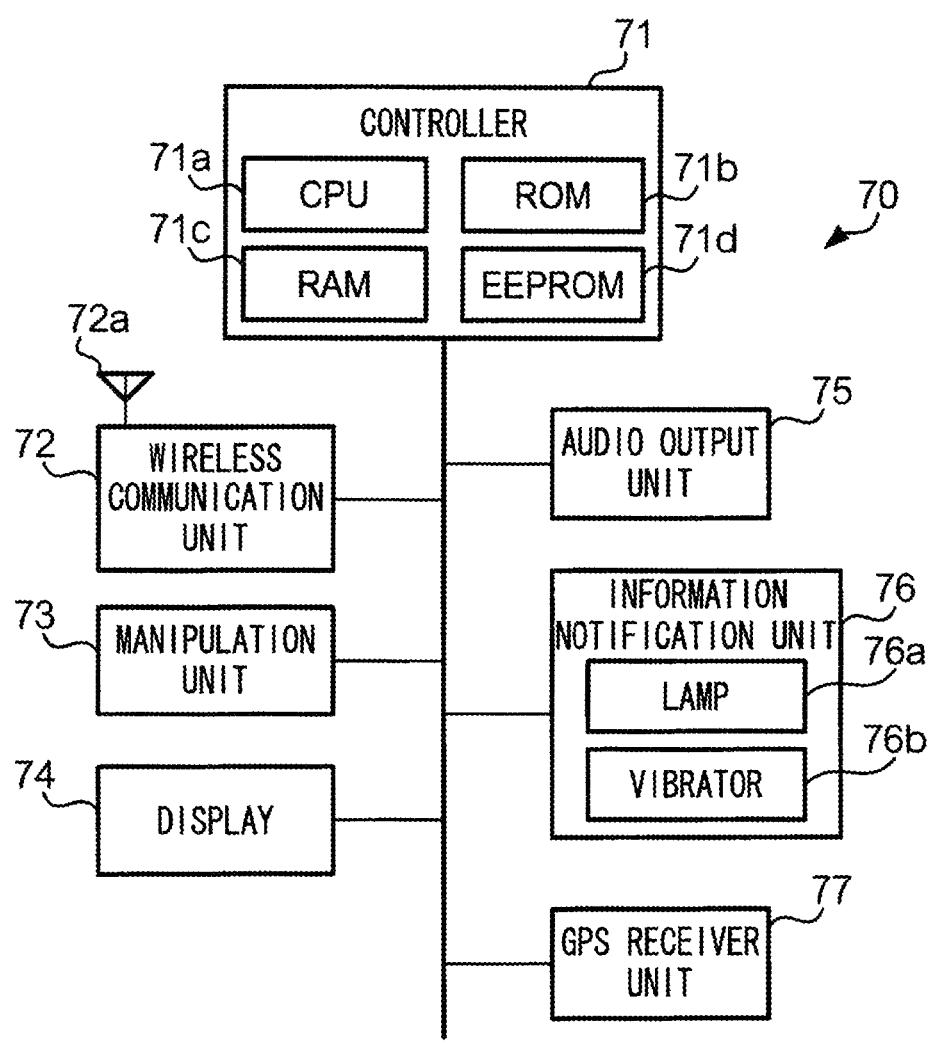
FIG. 30 is a block diagram showing a structure of a mobile communication terminal.

Further, the structure of each of the mobile communication terminals 70 will be described with reference to a block diagram shown in FIG. 30. As shown in the figure, each mobile communication terminal 70 includes a controller 71, a wireless communication unit 72, a manipulation unit 73, a display 74, an audio output unit 75, an information notification unit 76, and a GPS receiver unit 77. The controller 71, wireless communication unit 72, manipulation unit 73, display 74, audio output unit 75, and information notification unit 76 respectively have the same structures as the controller 51, wireless communication unit 52, manipulation unit 53, display 54, audio output unit 55, and information notification unit 56 in the first embodiment described above. However, content of a virtual space viewer stored in the controller 71 (EEPROM 71*d*) differs from that in the above first embodiment. The GPS receiver unit 77 has an antenna 77*a* and receives radio waves transmitted from a NAVSTAR (Navigation Satellite Timing And Ranging) satellite (a so-called GPS satellite).

The information providing system 200 has a structure as described above. With this structure, users of the mobile communication terminals 70 each start up the virtual space viewer to browse, post, and search message information items. The information management server 60 executes processings depending on items of information transmitted from the mobile communication terminals 70. Described first will be operations of a mobile communication terminal 70 in case of starting up the virtual space viewer and browsing or posting a message information item. Described second will be operations of the information management server 60 and a mobile communication terminal 70 in case of searching message information items. In the following, descriptions will be made mainly of differences which also apply to the above first embodiment, and processings which are common to both embodiments will be appropriately omitted from the following descriptions.

Figure 31:
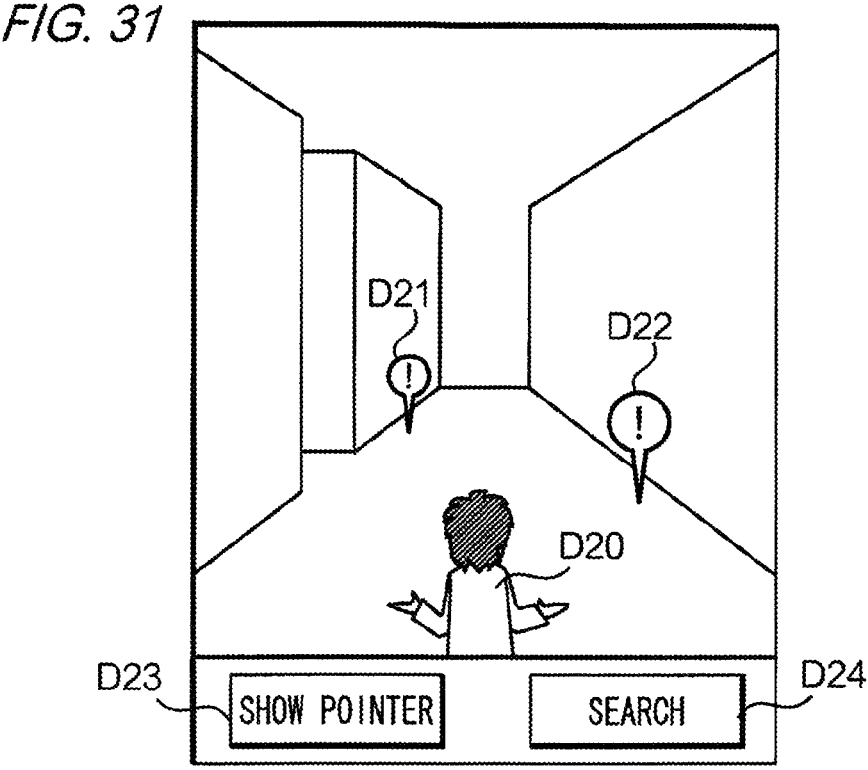
FIG. 31 shows an example of a screen image displayed by a display of the mobile communication terminal.

FIG. 31 shows an example of a screen image to be displayed on the display 74 when the virtual space viewer is started up by the controller 71. In the figure, an image D20 illustrates an avatar. Images D21 and D22 each suggest existence of a message information item, i.e., there are message information items associated with the positions of these images. Further, images D23 and D24 respectively represent functions assigned to soft buttons Bs1 and Bs2.

When starting up the virtual space viewer, the controller 71 specifies a position of the mobile communication terminal of its own on the basis of a radio wave received by the GPS receiver unit 77. The controller 71 transmits a position information item indicating the position to the information management server 60. An example of a known method for specifying a position is on the basis of a radio wave from a NAVSTAR satellite. Based on a received position information item, the information providing server 60 transmits information on which an image displayed on the mobile communication terminal 70 is further based, to the mobile communication terminal 70.

Figure 32:
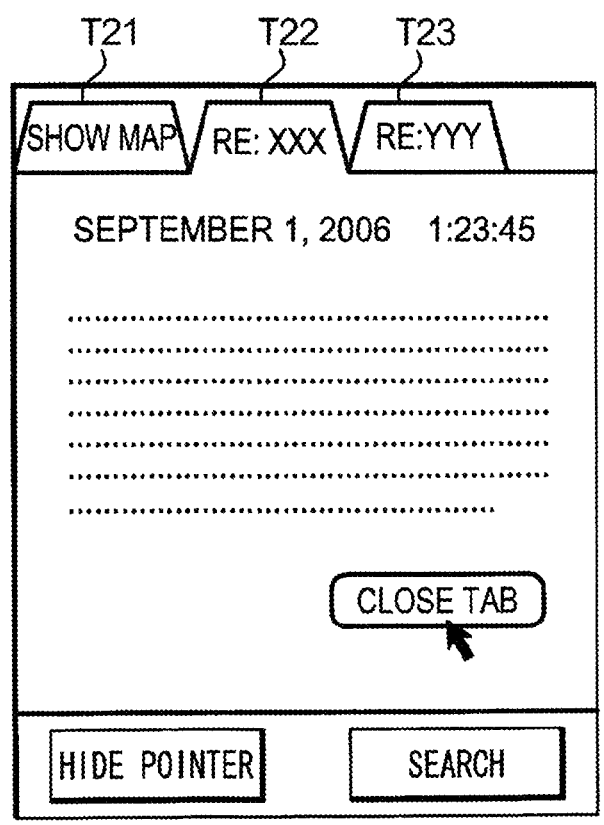
FIG. 32 also shows an example of a screen image displayed by the display of the mobile communication terminal.

To browse a message information item, the user of the mobile communication terminal 70 selects an image associated with a desired message information item by using a pointer. Then, the controller 71 of the mobile communication terminal 70 obtains (by, for example, downloading) a title and/or a body of the message information item associated with the selected image, and causes the display 74 to show the title and/or body. FIG. 32 shows a screen image displayed on the display 74. As shown in the figure, the controller 71 displays an image expressing a virtual space and images showing message information items so that the images can be switched by tabs T21, T22, and T23. The tab 21 corresponds to the image representing the virtual space. The tabs T22 and T23 respectively correspond to images showing selected message information items. As shown in the figure, if there are plural desired message information items to browse, the plural message information items are respectively displayed as plural tabs by selection of individual items from the plural message information items.

To post a message information item, the user of the mobile communication terminal 70 selects a desired position in the virtual space by the pointer. Then, the controller 71 of the mobile communication terminal 70 transmits a request for posting a message information item, to the information providing server 60, and receives data expressing a page for inputting a message information item, from the information providing server 60. Thereafter, data equivalent to a title and a body is input by the user, the controller 71 transmits the data and a position information item indicating the position selected by the user, to the information providing server 60. The controller 61 of the information providing server 60 generates a new record on the message information management table TB6, based on information obtained in this manner.

In a case of searching message information items, the mobile communication terminal 70 operates substantially in the same manner as in the first embodiment described above. However, the information providing server 60 operates in a different manner from that in the first embodiment. Specifically, the extraction processing (step Sc3) and the processing for calculating an area relevance degree (step Sc6) are different from those of the first embodiment.

In this embodiment, the extraction processing is to extract records each of which includes an obtained search word in the field "Title" or "Body". That is, the extraction processing according to this embodiment is not of a type which extracts indices from titles and bodies and uses the indices as targets to search. In this embodiment, entire titles and bodies are treated as targets to search, and therefore, all terms included in titles and bodies serve as keywords.

When calculating an area relevance degree in this embodiment, viewing counts of associated message information items are used in addition to the number of position information items specified in the step Sc4 and reliabilities of users. Specifically, an area relevance degree $A_{area}$ is obtained by the following expression (3), where the number of position information items specified in the step Sc4 is n, reliabilities of users who posted the message information items associated with the n position information items are expressed as $c_i$ (where I=1, 2, . . . , n), the viewing counts of the message information items associated with the n position information items are expressed as $t_i$ (where I=1, 2, . . . , n). In this expression, $C_1$ and $C_2$ are predetermined constants.

$$A_{area} = C_1 \sum_{i=1}^{n} c_i + C_2 \sum_{i=1}^{n} t_i \quad (3)$$

The expression (3) is obtained by applying a weight to the second member on the right side of the foregoing expression (1) where the weight corresponds to the viewing count. That is, when calculating an area relevance degree in this embodiment, "viewing counts of message information items" are applied as weights, in addition to the "reliabilities of users" also being applied as weights.

By performing processings as described above, the information providing system 200 according to this embodiment can obtain the same effects as described above in the first embodiment. In this embodiment, users of the mobile communication terminals 70 can post message information items about favorite topics at favorite places. Accordingly, a variety of information is accumulated at various locations.

Also in the information providing system 200 according to this embodiment, the virtual space is linked to actual locations, and therefore, certain relevance can be expected between a position of a message information item in the virtual space and a corresponding position in (or near) an actually existing location. That is, for example, there can be a situation that a great number of message information items relevant to motion pictures are accumulated near a movie theater or that a lot of message information items relevant to a restaurant are accumulated near the restaurant. Such message information items are accumulated as if so-called word-of-mouth information were collected. As a result, the information providing server 60 according to this embodiment can provide users of the mobile communication terminals 70 with a more recently revised style of information search. For example, when a user of a mobile communication terminal 70 visits an unfamiliar place and executes a search with a desired search word, the user can then discover in which direction to find an area where information items related to the search word are accumulated, or a route to reach such an area.

Also in the information providing system 200 according to this embodiment, a user of a mobile communication terminal 70 moves in accordance with a guide information item (e.g., an arrow) to reach a target area, and can then find "something" related to a search word in the area. For example, if a search is executed with a search term of "Chinese noodles", a target area may possibly include a region where a large number of Chinese noodle restaurants exist or a region where a topical Chinese noodle restaurant exists. Even if such a region or a topical restaurant or the like cannot be found, a hint for items relevant to the search word can be found by browsing message information items accumulated in the target area.

In addition, in the information providing system 200 according to this embodiment, the position of an avatar corresponds to the position of a user. In order to post or browse message information items, it is natural that the user willingly tries to move to a location where such message information items are accumulated. Accordingly, users who are interested in a certain item are expected to naturally gather in an area where message information items relevant to the certain item are accumulated. As a result, the information providing system 200 according to this embodiment can provide communication spots for people who share hobbies and/or preferences. Accordingly, a collection of information can be strongly promoted.

Further, various effects as described above interact with each other to provide users of the mobile communication terminals 70 with more entertainment than in a simple information search. Accordingly, use of the system can be promoted.

MODIFICATIONS

The invention has been described above with reference to examples of the first and second embodiment. The invention, however, is not limited to the exemplary embodiments described above but can be practiced in other various modes. According to the invention, modifications as follows can be made to the above exemplary embodiments.

1. Modification 1

In the first embodiment described above, the information providing server 40 transmits information indicating an outer appearance of an arrow (e.g., a width and end points), as a guide information item, to a mobile communication terminal 50. However, for example, the information providing server may obtain an image of an arrow by a calculation based on the guide information item, and may then transmit image data expressing a state in which the image of the arrow is overlapped on a virtual space.

Also in the above first embodiment, area relevance degrees are indicated by variations in widths of arrows. However, area relevance degrees may be distinguished by other differences in features in outer appearances of arrows. For example, colors of arrows may be varied depending on area relevance degrees. Alternatively, an arrow may flicker when an associated area relevance degree is not smaller than a predetermined level. In brief, guide information items need only to include information capable of enabling a user to visually distinguishing area relevance degrees, and the information need not be limited to variations in width of arrows.

In the above first embodiment, the width information item is a value obtained by dividing an area relevance degree by a distance between the position of an avatar and a predetermined position in a target area. However, a route length may be used in place of the distance. In other words, the route length is a distance which a user moves to reach a target area. To obtain a route length, a route may be determined by using path information items, and a length of the route may then be obtained. Otherwise, the width information item may depend only on area relevance degrees without depending on any distance or the route length.

Also in the above first embodiment, the guide information item indicates a route to reach a target area. However, the guide information item may indicate a direction directly towards a target area, without path information items being taken into consideration.

2. Modification 2

The guide information item may be displayed in a different form from an arrow. For example, the guide information item may be information for showing a target area (i.e., an area where the area relevance degree is not smaller than a predetermined level) in a different display style from the other areas. In this case, for example, such a different display form is achieved by changing the color of a target area from a usual color (before the color is changed). Alternatively, a marking image such as an icon may be displayed above a target area (in case of a three-dimensional virtual space) or in the center of a target area (in case of a two-dimensional virtual space). In a case of changing the color of a target area, the color may be changed only at a part of the target area, e.g., the color of only buildings may be changed.

If a target area is displayed in such a different style as described above, the guide information item needs only to include position information indicating the target area but need not include information equivalent to width information and/or end point information as described above.

3. Modification 3

When a message information item is being posted, a mobile communication terminal may transmit any other information item together with the message information item, and the information item may be used as a keyword. For example, mobile communication terminals each may be configured as follows. If an information item concerning a hobby, an interest, or a property of a user (hereinafter a "supplemental information item") is stored in the mobile communication terminal, and if the user posts a message information item concerning the hobby or property, the supplemental information item is transmitted associated with the message information item. More specifically, for example, a mobile communication terminal of a user whose hobby is to watch motion pictures may store a supplemental information item indicating "motion picture" in advance. When this user posts a message information item concerning a motion picture, the supplemental information item indicating "motion picture" is transmitted associated with the message information item.

4. Modification 4

The invention may further be modified by use of a supplemental information item as described above. For example, the information management server described above may store newest position information (e.g., as a position indication information item described previously) for each of avatars of the mobile communication terminals, and store a supplemental information item associated with the position indication information item. The information providing server may use the supplemental information item as a keyword. In this case, each mobile communication terminal is configured so as to transmit a supplemental information item together with a position indication information item.

In a configuration modified as described above, the information management server searches for position indication information items associated with the supplemental information item relevant to a search word, and specifies, as a target area, an area where the number of such position indication information items is not smaller than a predetermined number. At this time, the information management server may be configured so as to instruct a user of the mobile communication terminal to input a search word or to regard the transmitted supplemental information item as a search word.

With the configuration modified as described above, operations are as follows. That is, users of the mobile communication terminals freely move in a virtual space by using avatars. The information management server stores information indicating what a supplemental information item the avatar of each user has and where the avatars are positioned. If a user of a mobile communication terminal carries out a search with use of a search word, the information management server then outputs a guide information item indicating an area which includes a large number of avatars having supplemental information items relevant to the search word.

In this configuration, the user of the mobile communication terminal can know a location of an area where lots of users who share a hobby or an interest gather. If such an area is included in a virtual space, the user can communicate through avatars with other users who share a hobby or an interest together with the user. If such an area actually exists in the real world, the user can meet other users there who share a hobby or an interest together with the user, or visit a shop or the like where users who share a hobby or an interest gather. Further, if a property such as a gender or an age is used for a supplemental information item, for example, the user can know a location of an area where lots of users of the same generation or of another particular generation gather together.

In this modification, an image expressing an avatar corresponds to an example of the "display information item" according to the invention.

5. Modification 5

In the first embodiment described above, a mode of dividing a virtual space into areas having a predetermined size has been described in case of a method for specifying an area in the step Sc5. The method for specifying an area is not limited to this configuration. For example, in place of dividing a virtual space into areas, areas having a predetermined size may be laid out respectively at positions expressed as sets of coordinates in the virtual space. The number of position information items may be specified for each of the arranged areas. Further, the areas may have an arbitrary size, and can therefore be changed. For example, several choices may be prepared beforehand for the size of areas, and users of the mobile communication terminals may select any of the choices.

6. Modification 6

In the first embodiment described above, the number of position information items is weighted depending on reliabilities of users when calculating an area relevance degree. The weighting may be independent of reliabilities of users. In the second embodiment described above, the number of position information items is weighted depending on reliabilities of users and viewing counts. However, the weighting may depend on posted time in place of viewing counts. In this configuration, recentness of message information items can be reflected in area relevance degrees.

Each mobile communication terminal may be provided with a function of measuring time when a title or a body of a message information item is displayed and a function of notifying a bulletin board server or an information management server of the time. Then, the weighting as described above may be dependent on a time when each message information item is displayed.

Furthermore, for example, there can be a modified configuration that each user makes an evaluation when posting a message information item. The weighting as described above may be dependent on such an evaluation. As an example, an input item may be prepared so that an impression of a motion picture or a taste of food or drink can be evaluated in steps in a case of dealing with information concerning a motion picture or a restaurant.

7. Modification 7

In the first embodiment described above, a search word is determined by input from a user of a mobile communication terminal. However, a search word may be obtained without requiring that users input anything. For example, if a mobile communication terminal already stores data having a header area where information equivalent to a predetermined term is described, a term extracted from the data may be used as a search word. For example, a so-called electronic coupon may be used as the data.

8. Modification 8

In the above first embodiment, a notification information item is transmitted upon arrival of a user at a target area. However, the notification information item may be transmitted before the user reaches a target area. For example, the information management server may calculate a distance between a position indicated by a position indication information item transmitted from a mobile communication terminal and a predetermined position included in a target area. The information management server may output a notification information item if the calculated distance is smaller than a predetermined threshold.

9. Modification 9

In the above first embodiment, when a user reaches a target area, images of arrows which have been shown are hidden. However, further images of arrows may be displayed so as to point to individual message information items. Otherwise, a display style of a display data set may be varied so that a bulletin board system relevant to a search word can be distinguished from other bulletin board systems.

10. Modification 10

In the above embodiments, message information items which users browse are text information. However, message information items may include information other than text information. For example, a message information item may include image data, audio data, or a program for executing a predetermined processing. Such information other than text information may be added as property information, which may be used as a keyword.

11. Modification 11

In the above embodiments, mobile communication terminals are assumed to be mobile phones. However, mobile communication terminals may be portable computer devices such as PDAs (Personal Digital Assistance). In particular, the first embodiment is not limited only to use with mobile communication terminals.

Further, various functions performed by the information providing server can be compiled into one program. Then, the program can be provided in form of a recording medium which records the program or can be provided by downloading from a predetermined server via a network such as the internet.

12. Modification 12

In the above embodiments, an area where the area relevance degree is not smaller than a predetermined level is specified, and a guide information item is output based on the specified area. A result of specifying an area may further be used to provide different information.

For example, in a case of displaying a map, locations of public institutions or outstanding shops are often indicated by images such as icons (hereinafter simply referred to as "icons"). In this case, the icons are respectively assigned to properties (such as "restaurant", "convenience store", etc.), and are therefore associated with images depending on their respective properties. Icons are originally designed to show locations of shops and the like so that the locations are easily visually noted. When a communication terminal such as a mobile phone which has a limited display area is used, visibility may undesirably deteriorate by showing too many icons.

In such a case, display priorities may be set in advance for the icons, depending on the properties. The higher the display priority is, the more prioritized the displayed icon is. For example, if the virtual space is displayed three-dimensionally, an icon given a high display priority is shown up even when the icon is positioned very far away. An icon given a low display priority is not shown up before an avatar comes within a certain range. Otherwise, if the virtual space is displayed two-dimensionally, an icon given a high priority is shown up even when a broad area is displayed. An icon given a low priority is displayed only when the map scale is increased to show a small part of the broader area.

In this case, display control as described below can be achieved as follows. That is, each of properties of icons is regarded as a "keyword" according to the invention. In an area where the area relevance degree is not smaller than a predetermined level, the display priority of an icon having a property relevant to a search word used for calculating the area relevance degree is raised to be higher than a preset display priority. With this configuration, for example, when a user inputs "motion picture" as a search word, icons relevant to motion pictures, such as icons indicating locations of movie theaters, are displayed with a higher priority than other icons. Display control can further be modified as follows, in a case where an icon which has a property equivalent to a first keyword such as "restaurant" is further given a property equivalent to a second keyword such as "Chinese noodles" or "sushi". If a user inputs "Chinese noodles" as a search word in this case, only icons given a property of "Chinese noodles" are displayed among icons representing a large number of restaurants.

In the case of this modification, each "icon" can be said to be one of "display data sets" according to the invention, and each "property" can be said to be one of "keywords" also according to the invention. In this case, a structure equivalent to an information management device, as an area guide device, needs only to output a position information item of a corresponding area, and information indicating a property for which the display priority should be raised.

Hardware and/or software structures of bulletin board servers, an information management server, and mobile communication terminals according to the invention are not limited to structures shown in FIGS. 2, 9, 11, 28, and 30. Insofar as functions described above of the invention are performed, how the functions are practically constituted and provided can be arbitrarily determined.

What is claimed is:

1. An area guide device comprising:
a storage unit that stores a plurality of display information items each associated with a position in a virtual space defined by a collection of data items, a plurality of keywords, a plurality of position information items associated with the keywords, and a plurality of weight information items, each of the plurality of position information items being based on a predetermined coordinate system that defines positions on the virtual space, each of the plurality of display information items being associated with one of the plurality of keywords and one of the plurality of position information items, and each of the weight information items indicating weights to be applied respectively to each of the plurality of display information items;
an obtaining unit that obtains a search word;
an extraction unit that extracts any of the plurality of position information items associated with a keyword relevant to the search word obtained by the obtaining unit, from among the plurality of position information items stored in the storage unit;
a first specifying unit that specifies a first area of the virtual space in which an avatar moves where a number of position information items extracted by the extraction unit is equal to or greater than a predetermined number, wherein the predetermined number is greater than one;
a calculation unit that calculates a degree of relevance between the first area of the virtual space and the search word, on the basis of a summation of each of the weight information items stored respectively for each of the number of position information items extracted by the extraction unit;
a second specifying unit that specifies a second area of the virtual space where the degree of relevance calculated by the calculation unit is equal to or greater than a predetermined level; and
an output unit that outputs a guide information item indicating the second area of the virtual space;
wherein the calculation unit calculates the degree of relevance between the first area of the virtual space and the search word on the basis of a formulation expressed by $$A_{area} = C_1 \sum_{i=1}^{n} c_i$$

wherein $A_{area}$ represents the degree of relevance, n represents the number of position information items extracted by the extraction unit, $c_i$ represents the weight information items having i include 1 through n, and $C_1$ represents a predetermined constant.

2. The area guide device according to claim 1, wherein the output unit outputs a guide information item which indicates a direction or a route toward the area specified by the second specifying unit from a start point which is a position in the virtual space.

3. The area guide device according to claim 1, wherein the output unit outputs a guide information item for changing at least a part of a display style of the area specified by the second specifying unit.

4. The area guide device according to claim 2, wherein
the output unit outputs a guide information item including an outer-appearance information item which visually indicates the direction or route, and
the output unit includes a determination unit that determines a display style of the outer-appearance information item, depending on the degree of relevance calculated by the calculation unit for the area specified by the second specifying unit.

5. The area guide device according to claim 4, wherein the determination unit determines the display style of the outer-appearance information item, depending on the degree of relevance calculated by the calculation unit for the area specified by the second specifying unit, and depending on a distance or a route length from the area to the start point.

6. The area guide device according to claim 4, further comprising a position obtaining unit that obtains a position indication information item indicating a position of the start point, wherein the determination unit changes the display style of the outer-appearance information item, depending on the position of the start point indicated by the position indication information item obtained by the position obtaining unit.

7. The area guide device according to claim 2, further comprising a position obtaining unit that obtains a position indication information item indicating the position of the start point, wherein the output unit further outputs a notification information item indicating that a distance or a route length from the position included in the area specified by the second specifying unit to the position of the start point indicated by the position indication information item obtained by the position obtaining unit is equal to or smaller than a predetermined value, if the distance or the route length is equal to or smaller than the predetermined value.

8. The area guide device according to claim 1, wherein
the display information items each include a data set to be downloaded by a plurality of external terminals, and
the storage unit stores, for each of the plurality of display information items, a count information item indicating a number of times the data set has been downloaded, as the weight information item.

9. The area guide device according to claim 1, wherein
the display information items each include a data set to be displayed by a plurality of external terminals, and
the storage unit stores, for each of the plurality of display information items, a time information indicating a time length for which the data has been displayed, as the weight information item.

10. The area guide device according to claim 1, wherein
the plurality of display information items each have been generated, triggered by a data set which was input from a user of an external terminal, and
the storage unit stores, for each of the plurality of display information items, a property information item indicating a property of the user who has input the data set which triggered generation of the each of the plurality of display information items.

11. A computer program product encoded on a non-transitory computer-readable storage medium causing a computer to execute a process comprising:
obtaining a search word;
extracting any of a plurality of position information items associated with a keyword relevant to the obtained search word, from a storage unit that stores the plurality of display information items each associated with a position in a virtual space defined by a collection of data items, a plurality of keywords, a plurality of position information items associated with the keywords, and a plurality of weight information items, each of the plurality of position information items being based on a predetermined coordinate system that defines positions on the virtual space, each of the plurality of display information items being associated with one of the plurality of keywords and one of the plurality of position information items, and each of the weight information items indicating weights to be applied respectively to each of the plurality of display information items;
specifying a first area of the virtual space in which an avatar moves where a number of the extracted position information items is equal to or greater than a predetermined number, wherein the predetermined number is greater than one;
calculating a degree of relevance between the first specified area of the virtual space and the search word, on the basis of a summation of each of the weight information items stored respectively for each of the number of position information items extracted;
specifying a second area of the virtual space where the calculated degree of relevance is equal to or greater than a predetermined level; and
outputting a guide information item indicating the second specified area of the virtual space where the calculated degree of relevance is equal to or greater than the predetermined level;
wherein the calculation unit calculates the degree of relevance between the first area of the virtual space and the search word on the basis of a formulation expressed by $$A_{area} = C_1 \sum_{i=1}^{n} c_i$$

wherein $A_{area}$ represents the degree of relevance, n represents the number of position information items extracted by the extraction unit, $c_i$ represents the weight information items having i include 1 through n, and $C_1$ represents a predetermined constant.

12. The area guide device according to claim 1, wherein the weight information items comprise a plurality of reliabilities of users of mobile communication terminals.

13. The computer program product of claim 11, wherein the weight information items comprise a plurality of reliabilities of users of mobile communication terminals.

* * * * *